US012718342B2

(12) United States Patent
In et al.

(10) Patent No.: US 12,718,342 B2
(45) Date of Patent: Aug. 25, 2026

(54) DEVICE, SYSTEM, AND METHOD FOR VARIABLY PREDICTING VASE LIFE OF CUT FLOWERS BY USING HYPERSPECTRAL IMAGE AND THERMAL IMAGE

(71) Applicant: Andong National University Industry-Academic Cooperation Foundation, Andong-si (KR)

(72) Inventors: Byung Chun In, Andong-si (KR); Young Tae Kim, Andong-si (KR); Ji Yeong Ham, Andong-si (KR)

(73) Assignee: Andong National University Industry-Academic Cooperation Foundation, Andong-si (KR)

( * ) Notice: Subject to any disclaimer, the term of this patent is extended or adjusted under 35 U.S.C. 154(b) by 283 days.

(21) Appl. No.: 18/596,296

(22) Filed: Mar. 5, 2024

(65) Prior Publication Data

US 2025/0200732 A1 Jun. 19, 2025

(30) Foreign Application Priority Data

Dec. 15, 2023 (KR) ........................ 10-2023-0183765

(51) Int. Cl.
*G06V 10/77* (2022.01)
*G06T 7/00* (2017.01)
(Continued)

(52) U.S. Cl.
CPC ............ *G06T 7/0002* (2013.01); *G06V 10/20* (2022.01); *G06V 10/58* (2022.01); *G06V 10/60* (2022.01); *G06V 10/7715* (2022.01); *G06V 10/776* (2022.01); *G06V 10/82* (2022.01); *G06V 10/87* (2022.01); *G06V 20/60* (2022.01); *G06T 2207/10024* (2013.01);
(Continued)

(58) Field of Classification Search
None
See application file for complete search history.

(56) References Cited

U.S. PATENT DOCUMENTS 10,527,558 B2 1/2020 Sahu et al.
10,839,503 B2 11/2020 Schwartzer et al.
(Continued)

FOREIGN PATENT DOCUMENTS

KR 10-2019-0108275 A 2/2021

*Primary Examiner* — Idowu O Osifade
(74) *Attorney, Agent, or Firm* — You & IP, LLC

(57) ABSTRACT

A device, system, and method for variably predicting the vase life of cut flowers by using a hyperspectral image and a thermal image are proposed. The disclosed obtains the hyperspectral image of a cut flower plant by using a hyperspectral camera, analyzes the obtained image to discriminate a cut flower variety, and groups effects of lifespan impact factors according to the cut flower variety to differentiate weights for the factors, so as to predict a disease and lifespan state of the cut flower plant by variably using a prediction model optimized for the variety. An automation system is built for diagnosing the vase life of the cut flowers on the basis of the physiological response to diseases or bioactive substances of the cut flower plant, thereby being used to predict a post-harvest phenotype of the cut flower plant by reflecting pre-harvest plant features, and select a cut flower plant cultivar.

20 Claims, 18 Drawing Sheets

(51) Int. Cl.

| | |
|---|---|
| ***G06V 10/20*** | (2022.01) |
| ***G06V 10/58*** | (2022.01) |
| ***G06V 10/60*** | (2022.01) |
| ***G06V 10/70*** | (2022.01) |
| ***G06V 10/776*** | (2022.01) |
| ***G06V 10/82*** | (2022.01) |
| ***G06V 20/60*** | (2022.01) |

(52) U.S. Cl.

CPC ............... *G06T 2207/10048* (2013.01); *G06T 2207/20081* (2013.01); *G06T 2207/20084* (2013.01)

(56) References Cited

U.S. PATENT DOCUMENTS

| | | | | |
|---|---|---|---|---|
| 10,902,581 | B2 | 1/2021 | Magnus et al. | |
| 2019/0259108 | A1* | 8/2019 | Bongartz ............. | G06Q 10/063 |
| 2020/0117897 | A1* | 4/2020 | Froloff ................. | G06V 20/188 |
| 2022/0156921 | A1* | 5/2022 | Humpston ........... | G06V 20/188 |
| 2022/0252568 | A1 | 8/2022 | Schwartzr et al. | |
| 2022/0307971 | A1* | 9/2022 | Coen .................... | G06V 10/147 |

* cited by examiner

| | 1 | 2 | 3 | 4 | 5 | 6 | 7 | 8 | 9 | 10 | 11 | average |
|---|---|---|---|---|---|---|---|---|---|---|---|---|
| temperature (°C) | 24° | 26° | 23° | 20° | 20° | 21° | 22° | 22° | 20° | 21° | 20° | 21.72° |

Gray mold disease

| Level 40 | Score |
|---|---|
| 1 | 0 |
| 2 | 20 |
| 3 | 40 |
| 4 | 100 |

DEVICE, SYSTEM, AND METHOD FOR VARIABLY PREDICTING VASE LIFE OF CUT FLOWERS BY USING HYPERSPECTRAL IMAGE AND THERMAL IMAGE

STATEMENT REGARDING GOVERNMENT SPONSORED RESEARCH

This invention was supported by the Korea Institute of Planning and Evaluation for Technology in Food, Agriculture and Forestry (IPET) of Korea funded by the Ministry of Agriculture, Food and Rural Affairs (MAFRA). [Research Program name: "High Value-added Food Technology Development Program"; Research Project name: "Development of quality prediction and guarantee system for major flowers during export process"; Project Serial Number: 1545027013; Research Project Number: 322053032SB010]

CROSS REFERENCE TO RELATED APPLICATION

The present application claims priority to Korean Patent Application No. 10-2023-0183765, filed Dec. 15, 2023, the entire contents of which are incorporated herein for all purposes by this reference.

BACKGROUND OF THE INVENTION

Field of the Invention

The present disclosure relates to an electronic device and a method thereof and, more particularly, to a device, system, and method for variably predicting the vase life of cut flowers by using a hyperspectral image and a thermal image.

Description of the Related Art

The size of flower markets is gradually increasing. Especially, in a case of exporting flowers, it takes a certain period of time to export, so the vase life of the flowers may expire during that period. When a consumer receives flowers that have reached the end of their lifespan, the consumer's satisfaction with purchasing the flowers may decrease or the consumer may be disappointed, and thus the consumer's willingness to purchase the flowers may be reduced. When flowers are packaged in a packaging container such as a box, it is very difficult to check whether the flowers have reached the end of their lifespan or not. Therefore, research is underway to predict the vase life of flowers at an early stage.

DOCUMENTS OF RELATED ART (Patent Document 0001) U.S. Pat. No. 10,839,503 B2, published on Nov. 17, 2020

(Patent Document 0002) US Patent Application Publication No. US 2022/0252568 A1, published on Aug. 11, 2022 (Patent Document 0003) U.S. Pat. No. 10,527, 558 B2, published on Jan. 7, 2020

(Patent Document 0004) U.S. Pat. No. 10,902,581 B2, published on Jan. 26, 2021

(Patent Document 0005) Korean Patent Application Publication No. 10-2019-0108275, published on Feb. 5, 2021

SUMMARY OF THE INVENTION

An objective of the exemplary embodiments disclosed in the present disclosure is to build an automation system for the purpose of diagnosing the vase life of cut flowers on the basis of the physiological response to diseases or bioactive substances of a cut flower plant and to use the automation system to predict a post-harvest phenotype of the cut flower plant by reflecting pre-harvest plant features, and select a cultivar of the cut flower plant.

The problems to be solved by the present disclosure are not limited to the problems mentioned above, and other problems not mentioned herein will be clearly understood by those skilled in the art from the following description.

According to one aspect of the present disclosure for solving the above-described technical problem, there is provided a system for variably predicting vase life of cut flowers, the system including: a photographing device configured to photograph the cut flowers and provide a thermal image and a hyperspectral image of the cut flowers; and a prediction device configured to discriminate a cut flower variety on the basis of the thermal image and the hyperspectral image, set weights of lifespan impact factors affecting a lifespan according to the cut flower variety, and set up an artificial intelligence model optimized for the cut flower variety, so as to predict a disease and the vase life of the cut flowers.

According to another aspect of the present disclosure, there is provided a method for variably predicting vase life of cut flowers, the method including: capturing a thermal image of the cut flowers; capturing a hyperspectral image, which is a spectrum of the cut flowers; and predicting the vase life of the cut flowers on the basis of the thermal image and the hyperspectral image, wherein the predicting of the vase life of the cut flowers discriminates a cut flower variety on the basis of the thermal image and the hyperspectral image, sets weights of lifespan impact factors affecting a lifespan according to the cut flower variety, and sets up an artificial intelligence model optimized for the cut flower variety, so as to predict a disease and the vase life of the cut flowers.

According to a yet another aspect of the present disclosure, there is provided a device for variably predicting vase life of cut flowers, the device including: a storage unit configured to store information on an algorithm for performing operations and an artificial intelligence model; and a processor configured to discriminate a cut flower variety on the basis of a thermal image and a hyperspectral image, which are for the cut flowers and received from the outside, set weights of lifespan impact factors affecting a lifespan according to the cut flower variety, and set up the artificial intelligence model optimized for the cut flower variety, so as to predict a disease and the vase life of the cut flowers.

In addition to this, there may be further provided a computer program stored in a computer-readable recording medium for execution in order to implement the embodiments of the present disclosure.

Moreover, there may be further provided a computer-readable recording medium configured to record a computer program for executing a method for implementing the embodiments of the present disclosure.

According to the problem solution described above of the present disclosure, the problem solution may be applied to build an automation system for the purpose of diagnosing the vase life of cut flowers on the basis of the physiological response to diseases or bioactive substances of a cut flower plant, thereby using the automation system to predict a post-harvest phenotype of the cut flower plant by reflecting pre-harvest plant features, and select a cultivar of the cut flower plant.

The effects of the present disclosure are not limited to the above-mentioned effects, and other effects not described above will be clearly understood by those skilled in the art from the following description.

DETAILED DESCRIPTION OF THE INVENTION

Figure 1:
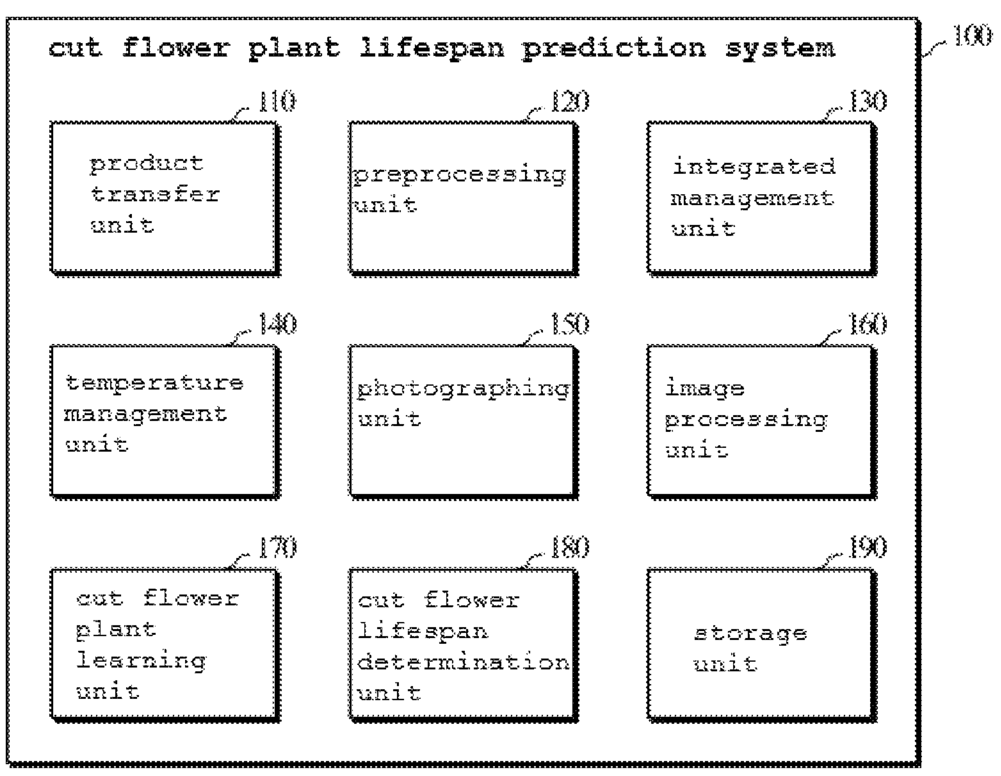
FIG. 1 is a block diagram illustrating a system according to the present disclosure.

Like reference numerals generally denote like elements throughout the present disclosure. The present disclosure does not describe all elements of the exemplary embodiments, and general content or redundant content between the exemplary embodiments in the art to which the present disclosure pertains will be omitted. The terms "part/unit, module, member, and block" used in this specification may be realized as software or hardware, and depending on the exemplary embodiments, a plurality of "parts, modules, members, and blocks" may be implemented as one component, or the "part, module, member, and block" may also include the plurality of components.

Throughout this specification, when a part is said to be "connected" to another part, an expression such as "connected" is intended to include not only "directly connected" but also "indirectly connected". The indirect connection includes connections through a wireless communication network.

In addition, when a part is said to "include" or "comprise" a certain component, it means that it may further include or comprise other components, rather than excluding other components unless the context clearly indicates otherwise.

Throughout the specification, when a member is said to be located "on" another member, this includes not only a case where the member is in contact with another member, but also a case where a yet another member exists in between two members.

Terms such as first, second, etc. are used to distinguish one component from another component, and components are not limited by the aforementioned terms.

The singular forms are intended to include the plural forms as well, unless the context clearly indicates an exception.

The identification code for each of steps is used for convenience of description. The identification code does not describe the order of each step, and each step may be performed in a different order than a specified order unless the context clearly states the specific order. Hereinafter, an operation principle and exemplary embodiments of the present disclosure will be described with reference to the attached drawings.

In the present specification, a "device according to the present disclosure" includes all various devices capable of performing computational processing and providing resultant outputs to users. For example, the device according to the present disclosure may include a computer, a server device, and a portable terminal, or a combination thereof.

Here, the computer may include, for example, a laptop equipped with a web browser, a desktop, a laptop, a tablet PC, a slate PC, etc. The server device is a server for processing information by communicating with an external device, and may include an application server, a computing server, a database server, a file server, a game server, a mail server, a proxy server, a web servers, etc.

For example, as a wireless communication device having guaranteed portability and mobility, the portable terminal may include: a handheld-based wireless communication device of any kind such as a personal communication system (PCS), a global system for mobile communications (GSM) device, a personal digital cellular (PDC) device, a personal handy-phone system (PHS), a personal digital assistant (PDA), an international mobile telecommunication (IMT)-2000 device, a code division multiple access (CDMA)-2000 device, a wideband code division multiple access (W-CDMA) device, a wireless broadband internet (WiBro) terminal, and a smartphone; and a wearable device such as a watch, a ring, a bracelet, an anklet, a necklace, glasses, contact lenses, or a head-mounted device (HMD).

Functions related to artificial intelligence according to the present disclosure are operated through a processor and memory. As for the processor, it may be configured with one processor or a plurality of processors. In this case, one or the plurality of processors may be configured with a general-purpose processor such as a central processing unit (CPU), an application processor (AP), and a digital signal processor (DSP), a graphics-specific processor such as a graphic processing unit (GPU) and a vision processing unit (VPU), and an artificial intelligence-specific processor such as a neural network processing unit (NPU). One or the plurality of processors control to process input data according to a predefined operation rule or an artificial intelligence model, which is stored in the memory. Alternatively, in a case where one or the plurality of processors are processors dedicated to artificial intelligence, the processors dedicated to artificial intelligence may be designed with hardware structures specialized for processing a specific artificial intelligence model. For example, the processors may include a micro-controller unit (MCU), a fan control actuator, an accelerated processing unit (APU), etc.

The predefined operation rule or artificial intelligence model is characterized by being created through learning. Here, being created through the learning means that a fundamental artificial intelligence model is trained by using a plurality of pieces of training data through a training algorithm, so as to create the predefined operation rule or artificial intelligence model, which is established to perform the desired characteristics (or objectives). Such learning may be realized in a device itself on which the artificial intelligence according to the present disclosure is performed, or may be completed through a separate server and/or system. The example of learning algorithms include supervised learning, unsupervised learning, semi-supervised learning, or reinforcement learning, but is not limited to the example described above.

An artificial intelligence model may be composed of a plurality of neural network layers. Each of the plurality of neural network layers has a plurality of weight values, and neural network calculation is performed through calculation between the calculated results of previous layers and the plurality of weights. The plurality of weight values of the plurality of neural network layers may be optimized by the learning results of the artificial intelligence model. For example, during a learning process, the plurality of weight values may be updated so that loss values or cost values obtained from the artificial intelligence model are reduced or minimized. An artificial neural network may include a deep neural network (DNN). This may be, for example, a convolutional neural network (CNN), the deep neural network (DNN), a recurrent neural network (RNN), a restricted Boltzmann machine (RBM), a deep belief network (DBN), a bidirectional recurrent deep neural network (BRDNN), a deep Q-network, or the like, but is not limited to the above example.

According to the exemplary embodiment of the present disclosure, a processor may implement artificial intelligence. Artificial intelligence refers to an artificial neural network-based machine learning method that allows a machine to learn by imitating human biological neurons. Artificial intelligence methodology may be divided according to leaning methods thereof and includes: supervised learning with a determined solution (i.e., output data) to a problem (i.e., input data) due to providing the input data and output data together as training data; unsupervised learning with no determined solution (i.e., output data) to a problem (i.e., input data) due to providing only the input data without the output data; and reinforcement learning with learning to proceed in a direction of maximally increasing rewards given in an external environment every time an action is taken in a current state. In addition, the artificial intelligence methodology may be divided according to structures thereof, and widely used structures of deep learning technology may be divided into a convolutional neural network (CNN), a recurrent neural network (RNN), a transformer, a generative adversarial network (GAN), etc.

The present device and system may include an artificial intelligence model. The artificial intelligence model may be a single artificial intelligence model, and may also be implemented with a plurality of artificial intelligence models. The artificial intelligence model may be composed of a neural network (or an artificial neural network) and may include a statistical learning algorithm imitating biological neurons in machine learning and cognitive science. The neural network may refer to the overall model with problem-solving capabilities, wherein artificial neurons (i.e., nodes) forming a network by coupling synapses are configured to change synaptic coupling strength through learning. The neurons in the neural network may include combinations of weights or biases. The neural network may include one or more layers composed of one or more neurons or nodes. Exemplarily, a neural network device may include an input layer, a hidden layer, and an output layer. The neural network constituting the device may infer a result (i.e., an output) to be predicted from an arbitrary input by changing weights of neurons through learning.

The processor may create a neural network, train (or learn) the neural network, perform a calculation based on received input data, generate an information signal based on performed results, or retrain the neural network. The neural network models may include various types of models of a convolution neural network (CNN) such as GoogleNet, AlexNet, and VGGNet, a region with convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzman machine (RBM), a fully convolutional network, a long short-term memory (LSTM) network, a classification network, and the like, but are not limited thereto. As for processor, one or more processors for performing calculations according to the neural network models may be included. For example, the neural networks may include a deep neural network.

The neural networks may include a convolutional neural network (CNN), a recurrent neural network (RNN), a perceptron, a multilayer perceptron, a feedforward (FF) neural network, a radial basis function (RBF) network, a deep feed forward (DFF) neural network, a long short term memory (LSTM) neural network, a gated recurrent unit (GRU), an auto encoder (AE), a variational auto encoder (VAE), a denoising auto encoder (DAE), a sparse auto encoder (SAE), a Markov Chain (MC) neural network, a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differential neural computer (DNC), a neural Turing machine (NTM), a capsule network (CN), a Kohonen network (KN), and an attention network (AN), but are not limited thereto and those skilled in the art will understand that the neural networks may include any neural networks.

According to the exemplary embodiment of the present disclosure, the processor may be configured to use various artificial intelligence structures and algorithms of a convolution neural network (CNN) such as GoogleNet, AlexNet, and VGGNet, a region with convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzman machine (RBM), a fully convolutional network, a long short-term memory (LSTM) network, a classification network, generative modeling, explainable AI, continual AI, representation learning, AI for material design, algorithms of BERT, SP-BERT, MRC/QA, Text Analysis, a dialog system, GPT-3, and GPT-4 for natural language processing, algorithms of visual analytics, visual understanding, and video Synthesis for vision processing, algorithms of anomaly detection and prediction for ResNet data intelligence, time-series forecasting, optimization, recommendation, data creation, etc., but are not limited thereto. Hereinafter, the exemplary embodiments of the present disclosure will be described in detail with reference to the accompanying drawings.

FIG. 1 is a block diagram illustrating a system according to the present disclosure.

Referring to FIG. 1, a system 100 of the present disclosure may be referred to as a cut flower plant lifespan prediction system. The system 100 may predict the vase life of cut flower plants (or may simply be referred to as cut flowers) by using a hyperspectral imaging system. The system 100 may obtain a hyperspectral image (e.g., an image) of the cut flowers by using a hyperspectral camera, discriminate a cut flower variety by analyzing the obtained hyperspectral image, and vary weights on factors by grouping (or clustering) impacts of lifespan impact factors according to the cut flower variety, so that a disease and the vase life of the cut flowers may be predicted by variably using prediction models (e.g., artificial intelligence models) optimized for the cut flower variety. The system 100 may variably predict the vase life of the cut flowers. The system 100 may include a product transfer unit 110, a preprocessing unit 120, an integrated management unit 130, a temperature management unit 140, a photographing unit 150, an image processing unit 160, a cut flower plant learning unit 170, a cut flower lifespan determination unit 180, and a storage unit 190.

The product transfer unit 110 may separate a bunch of cut flowers. The product transfer unit 110 may measure the number of cut flowers. The product transfer unit 110 may transfer the cut flowers bottom-up and/or top-down.

The preprocessing unit 120 may separate a bunch of cut flowers. The preprocessing unit 120 may measure the number of cut flowers. The preprocessing unit 120 may transfer the cut flowers top-down.

The integrated management unit 130 may manage selection conditions for cut flowers. The integrated management unit 130 may set photographing conditions for the cut flowers. The integrated management unit 130 may control selection speed of the cut flowers.

The temperature management unit 140 may set a temperature of a measurement box containing cut flowers. The temperature management unit 140 may set a target temperature for the cut flowers. The temperature management unit 140 may change the amount of incoming air and control temperature by controlling an air conditioner.

The photographing unit 150 may photograph (or capture an image of) cut flowers. The photographing unit 150 may generate a thermal image of the cut flowers. To this end, the photographing unit 150 may include a thermal imaging camera. The photographing unit 150 may generate an infrared (IR) image of the cut flowers. To this end, the photographing unit 150 may include an infrared camera (or IR camera). The photographing unit 150 may generate a hyperspectral image of the cut flowers. To this end, the photographing unit 150 may include a hyperspectral camera. In the exemplary embodiment, the photographing unit 150 includes the thermal imaging camera and the hyperspectral camera, and the photographing unit 150 may capture images of the cut flowers and provide the thermal image and hyperspectral image of the cut flowers. The photographing unit 150 may be referred to as a photographing device.

The image processing unit 160 may preprocess images. Here, the images may include, for example, a thermal image and/or a hyperspectral image. The image processing unit 160 may discriminate a cut flower variety. The image processing unit 160 may discriminate (or detect) the cut flower variety on the basis of the thermal image and hyperspectral image. The image processing unit 160 may detect cut flower quality factors representing quality factors of the cut flowers.

The cut flower plant learning unit 170 may generate an artificial intelligence model that predicts the vase life of cut flowers on the basis of training images of cut flowers. Here, the training images may include, for example, a thermal image and/or a hyperspectral image of the cut flowers. The training images may include, for example, an N-dimensional tensor. Here, for example, the N-dimensional tensor may include: a one-dimensional tensor including features of spectral bands; a three-dimensional tensor including two-dimensional coordinates (e.g., an x-coordinate and a y-coordinate), and signal intensity; a four-dimensional tensor including features of the two-dimensional coordinates (e.g., the x-coordinate and the y-coordinate), the signal intensity, and the spectral bands; and so on. However, this is not limited thereto.

The cut flower lifespan determination unit 180 may set weights of lifespan impact factors affecting a lifespan depending on cut flower varieties. The cut flower lifespan determination unit 180 may predict a disease and the lifespan of cut flowers by setting an artificial intelligence model optimized for a cut flower variety.

In the exemplary embodiment, the processor of the device for variably predicting the vase life of cut flowers may include the integrated management unit 130, the temperature management unit 140, the image processing unit 160, the cut flower plant learning unit 170, and the cut flower lifespan determination unit 180. In this case, the device for variably predicting the vase life of the cut flowers may be referred to as a prediction device.

The storage unit 190 may store data for supporting various functions of the system 100 and programs for the operation of the processor, store input/output data (e.g., music files, still images, videos, etc.), and store a plurality of application programs or applications which are running on the system 100, and data and commands for the operation of the system 100. At least some of these applications may be downloaded from an external server though wireless communication. As such, the storage unit 190 may include at least one type of storage media including a flash memory type, a hard disk type, a solid state disk type (SSD), a silicon disk drive type (SDD), a multimedia card micro type, a card type memory (e.g., an SD or XD memory, etc.), types of memory such as a random access memory (RAM), a static random access memory (SRAM), a read-only memory (ROM), an electrically erasable programmable read-Only memory (EEPROM), a programmable read-only memory (PROM), a magnetic memory, a magnetic disk, and an optical disk. The storage unit 190 may further include a database that stores various data.

In the exemplary embodiment, the processor (e.g., the integrated management unit 130, temperature management unit 140, image processing unit 160, cut flower plant learning unit 170, and cut flower lifespan determination unit 180), and the storage unit 190 may be included in the prediction device.

The processor may implement the aforementioned artificial intelligence. As described above, artificial intelligence methodology may be divided into supervised learning, unsupervised learning, and reinforcement learning. The structure of deep learning technology may be divided into CNN, RNN, Transformer, GAN, etc. As for the artificial intelligence model, one or more artificial intelligence models may be provided therefor. As described above, the processor may create a neural network, train (or learn) the neural network, perform calculation based on the received input data, generate information signals based on the performed results, or retrain the neural network. The neural network may include a CNN, an RNN, a perceptron, a multi-layer perceptron, etc., but is not limited thereto and those skilled in the art will understand that the neural network may include any neural networks. As described above, the processor may use various types of artificial intelligence structures and algorithms, including CNN such as GoogleNet, AlexNet, and VGGNet, R-CNN, techniques of BERT, SP-BERT, MRC/QA, Text Analysis, a dialog system, GPT-3, and GPT-4 for natural language processing, techniques of visual analytics, visual understanding, and video synthesis for vision processing, and techniques of anomaly detection, prediction, time-series forecasting, optimization, recommendation, and data creation for ResNet data intelligence, but is not limited thereto. CNN may be formed in a structure alternately repeating pooling layers several times, so as to allow extracting features, which are invariant to changes in position or rotation, by spatially integrating convolution layers and feature maps, the convolution layers applying a plurality of filters to each region of an image and generating the feature maps. Through this way, various levels of features may be extracted, from low-level features such as points, lines, and surfaces to complex and meaningful high-level features. The convolution layers may obtain the feature maps by taking a nonlinear activation function as an inner product of a filter and a local receptive field for each patch of the input image. Compared to other network structures, CNN may be characterized by having sparse connectivity and using filters with shared weights. Such a connection structure reduces the number of parameters to be learned, and makes learning efficient through a backpropagation algorithm, whereby prediction performance may be ultimately improved. As such, the features finally extracted through the repetition of the convolutional layers and the pooling layers are combined with a classification model such as a multi-layer perceptron (MLP) or a support vector machine (SVM) in a form of a fully-connected layer, and may be used for learning and prediction of a compression model. Meanwhile, a problem development model based on artificial intelligence may mean an artificial intelligence model trained on the basis of deep learning, and may also mean a model trained by using a convolutional neural network (CNN) as an example. In addition, the problem development model based on artificial intelligence may also include at least one algorithm among natural language processing (NLP), random forest (RF), support vector machine (SVC), extra gradient boost (XGB), decision trees (DC), K-nearest neighbors (KNN), Gaussian naive Bayes (GNB), stochastic gradient descent (SGD), linear discriminant analysis (LDA), Ridge, Lasso, and Elastic net.

According to the exemplary embodiments described above, by building the automation system for the purpose of diagnosing the vase life of cut flowers on the basis of the physiological response to diseases or bioactive substances of a cut flower plant, the automation system may be used to predict a post-harvest phenotype of the cut flower plant by reflecting pre-harvest plant features, and select a cultivar of the cut flower plant.

Figure 2A:
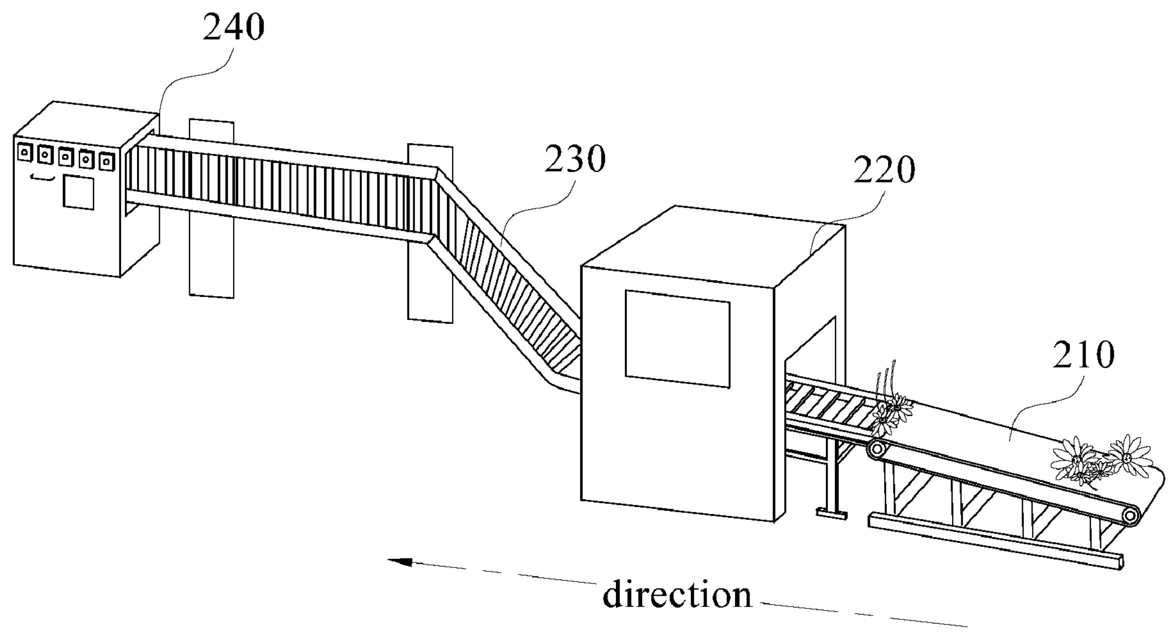
FIGS. 2A, 2B, 2C, and 2D are views exemplarily illustrating a cut flower lifespan prediction system according to the present disclosure.
Figure 2B:
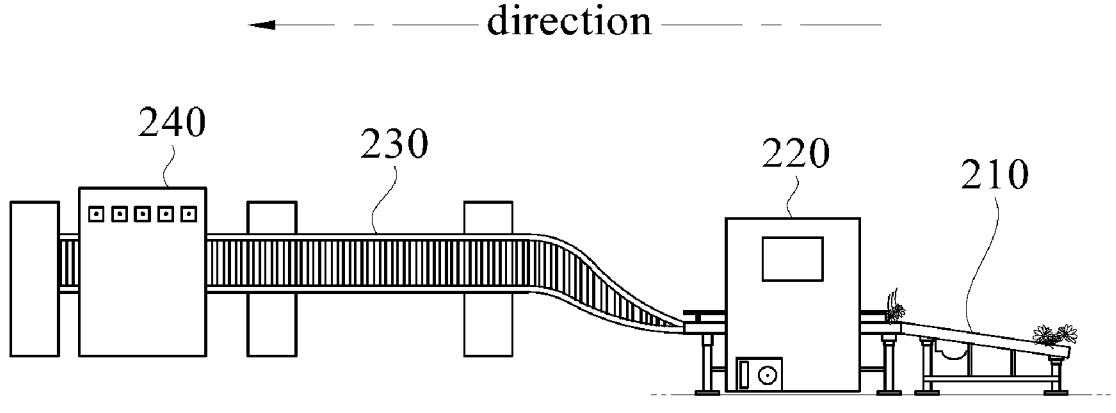
Figure 2C:
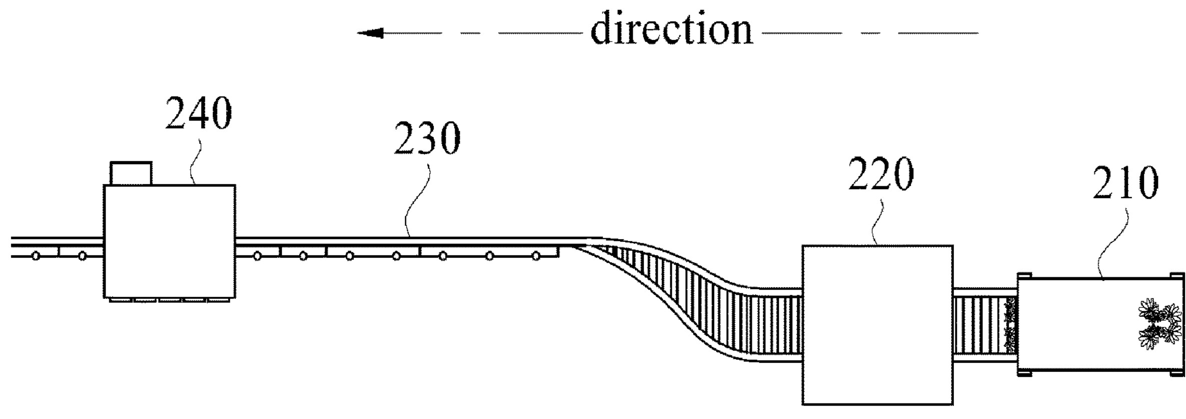
Figure 2D:
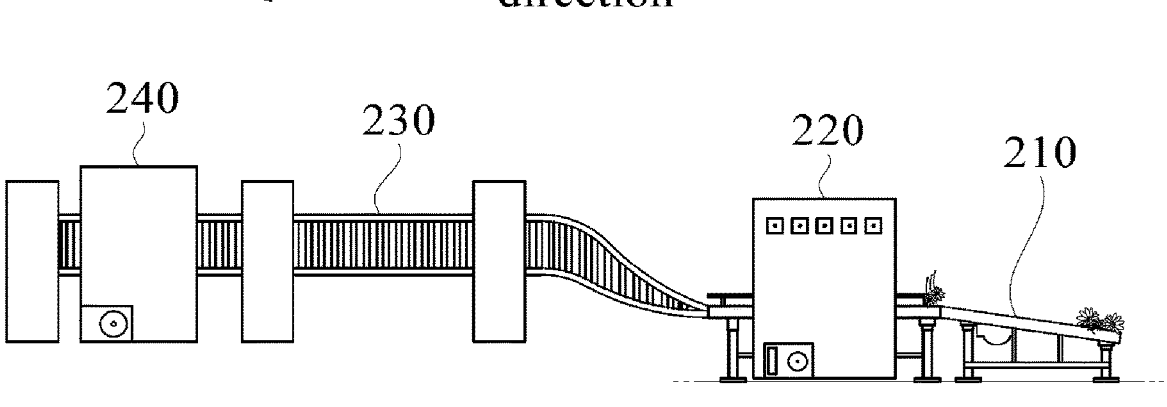

FIGS. 2A, 2B, 2C, and 2D are views exemplarily illustrating a cut flower lifespan prediction system according to the present disclosure. Specifically, FIG. 2A is a front perspective view illustrating photographing devices and transfer devices, FIG. 2B is a front view illustrating the photographing devices and the transfer devices, FIG. 2C is a top view illustrating the photographing devices and the transfer devices, and FIG. 2D is a rear view illustrating the photographing devices and the transfer devices.

Referring to FIGS. 1, 2A, 2B, 2C, and 2D, cut flowers of the present disclosure may be first placed on a first transfer device 210, and may be moved from the first transfer device 210 to a second transfer device 230 in a direction as shown in FIGS. 2A, 2B, 2C, and 2D. Each of the first and second transfer devices 210 and 230 may include a conveyor belt and a support member, etc. While the cut flowers are being moved, a photographing unit 150 may photograph the cut flowers. In an exemplary embodiment, the photographing unit 150 may include a first photographing device 220 and a second photographing device 240. The first photographing device 220 according to the exemplary embodiment may include a thermal imaging camera. The first photographing device 220 may vertically erect the cut flowers placed horizontally on the first transfer device 210 and transfer the vertically standing cut flowers to the second transfer device 230. The cut flowers placed in the first transfer device 210 may be input into the first photographing device 220 as many as the total number of the cut flowers to be transferred and erectable in the second transfer device 230. For example, on average, 3600 cut flowers per unit time may be input into the first photographing device 220 by the first transfer device 210. The first photographing device 220 may count the total number of the cut flowers. A model used in the first photographing device 220 may be, for example, YOLO. The second photographing device 240 according to the exemplary embodiment may include a hyperspectral camera. The second photographing device 240 may verify a thermal image on the basis of a hyperspectral image. The second photographing device 240 may check a temperature of a stem portion of the cut flowers to check moisture movement, e.g., checking whether vessels of the cut flowers are blocked or not. The second photographing device 240 further includes a thermal imaging camera having relatively lower resolution than resolution of the thermal imaging camera of the first photographing device 220, and may also capture some thermal images (e.g., pictures) including infrared information (or IR information) and red, green, and blue (RGB) information.

Figure 3:
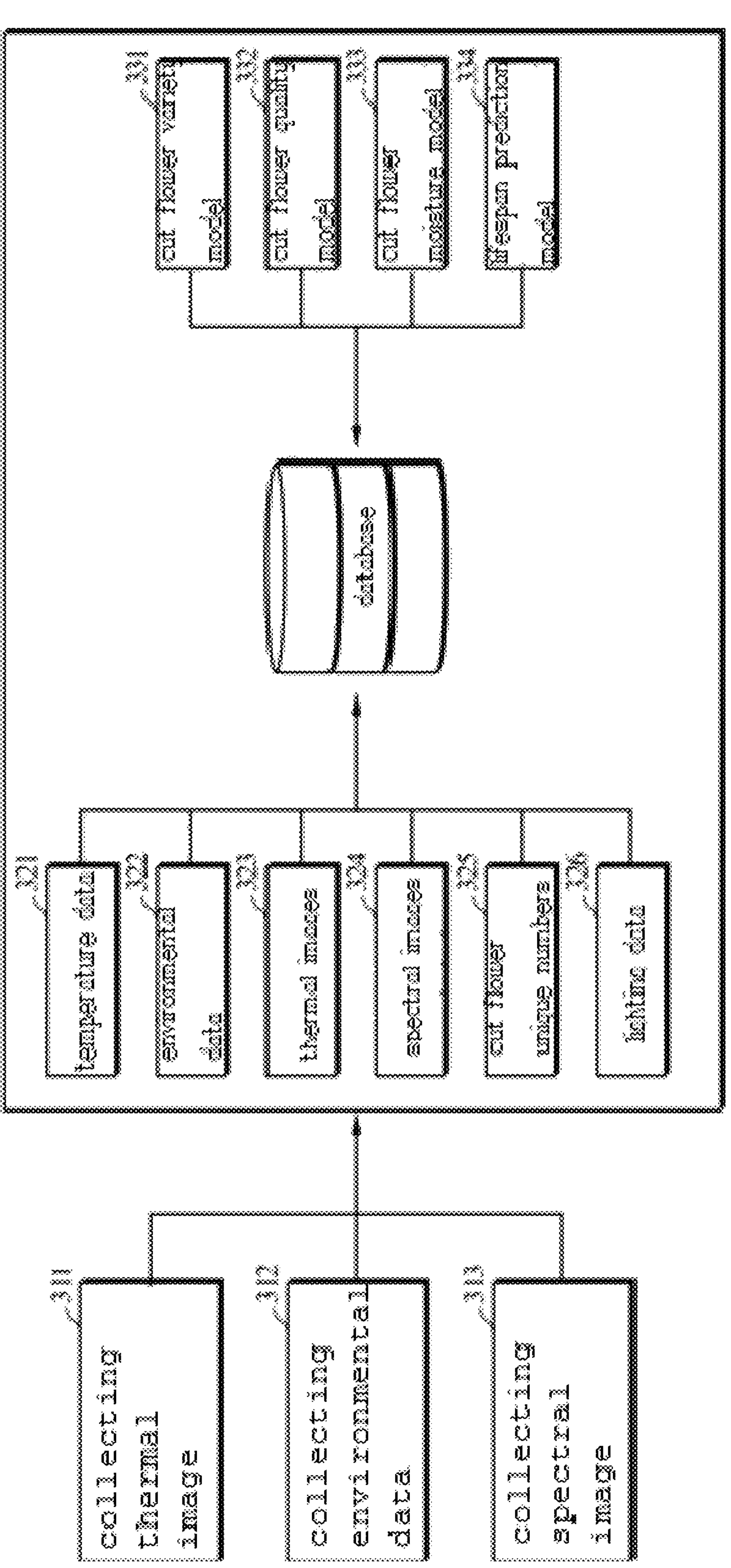
FIG. 3 is a view exemplarily illustrating a database and an artificial intelligence model according to the present disclosure.

FIG. 3 is a view exemplarily illustrating a database and an artificial intelligence model according to the present disclosure.

Referring to FIGS. 1 and 3, in step 311, a thermal image may be collected by the photographing unit 150. In step 312, environmental data may be collected by the integrated management unit 130, temperature management unit 140, etc. In step 313, a spectral image may be collected by the photographing unit 150. The spectral image may correspond to a hyperspectral image.

Temperature data 321, environmental data 322, thermal images 323, spectral images 324, cut flower unique numbers 325, and lighting data 326 may be stored in a database (e.g., the storage unit 190) of the system 100. In the lighting data, lighting or a light source (or heat or temperature caused by the light source) may be uniform due to the nature of the principle by which reflection values are measured. For example, reflectance at a time of measuring cut flowers at about 10 degrees may appear higher than reflectance at a time of measuring the cut flowers at about 5 degrees.

A cut flower variety model 331, a cut flower quality model 332, a cut flower moisture model 333, and a lifespan prediction model 334 are artificial intelligence models, and may be stored in the database (e.g., the storage unit 190) of the system 100. Each of the cut flower variety model 331, the cut flower quality model 332, the cut flower moisture model 333, and the lifespan prediction model 334 may be a model optimized for a cut flower variety.

Figure 4:
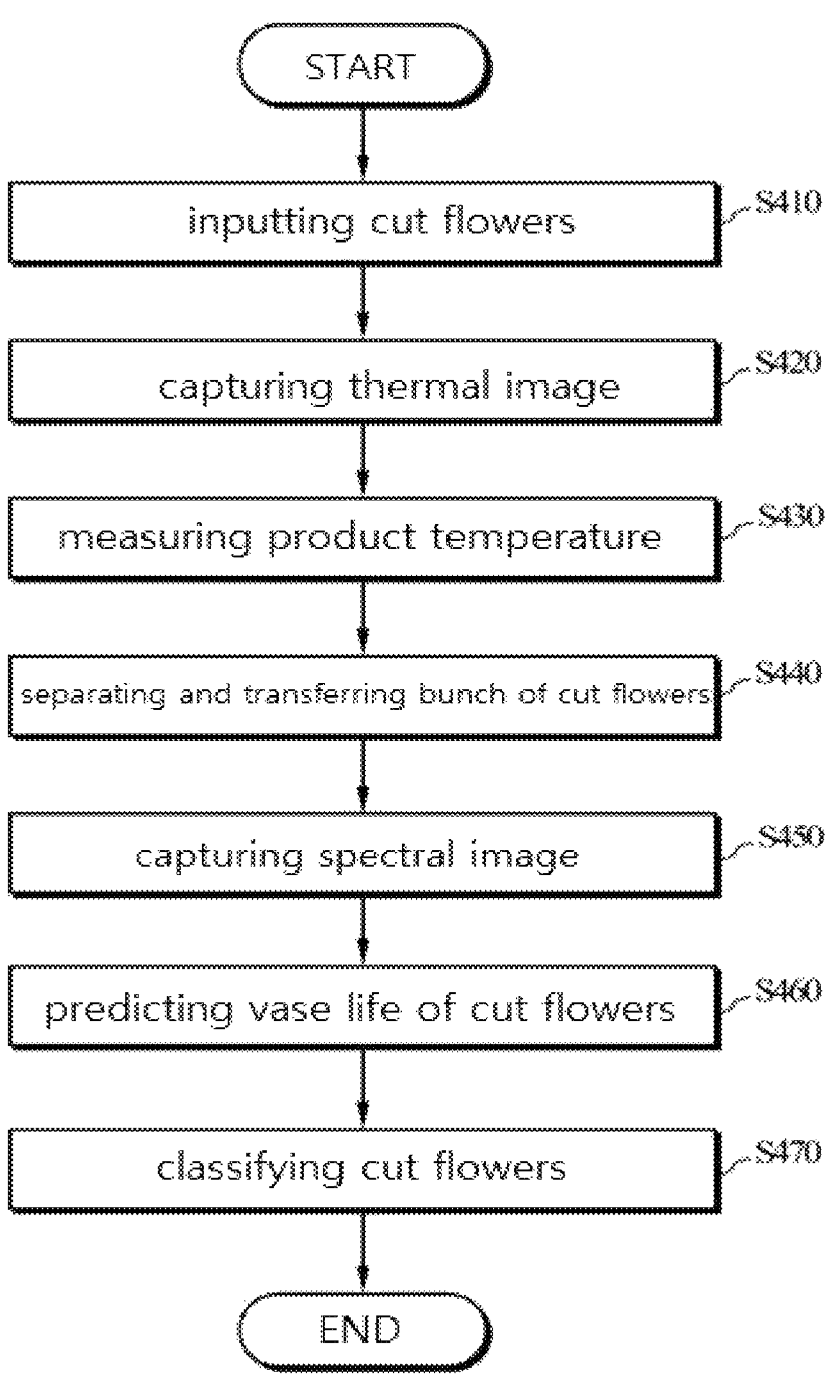
FIG. 4 is a flowchart illustrating a method according to an exemplary embodiment of the present disclosure.

FIG. 4 is a flowchart illustrating a method according to an exemplary embodiment of the present disclosure.

Referring to FIGS. 1 and 4, the method for variably predicting the vase life of cut flowers according to the exemplary embodiment may include step S410, step S420, step S430, step S440, step S450, step S460, and step S470.

In step S410, cut flowers may be input into a system 100.

In step S420, the system 100 may capture a thermal image of the input cut flowers. For example, a thermal imaging camera of a photographing unit 150 may generate a thermal image by photographing the cut flowers.

In step S430, the system 100 may measure a product temperature of the cut flowers on the basis of the thermal image.

In step S440, the system may separate and transport a bunch of the cut flowers.

In step S450, the system 100 may capture a spectral image of the cut flowers. For example, a hyperspectral camera of the photographing unit 150 may generate the spectral image by photographing the cut flowers.

In step S460, the system 100 may predict the vase life of cut flowers on the basis of the thermal image and spectral image. For example, a processor included in a prediction device of the system 100 may discriminate a cut flower variety on the basis of the thermal image and hyperspectral image, set weights of lifespan impact factors affecting a lifespan according to the cut flower variety, and set an artificial intelligence model optimized for the cut flower variety, so as to predict a disease and the vase life of the cut flowers.

In the exemplary embodiment of step S460, the processor may add spectral band factors reflected with features of spectral bands to a three-dimensional tensor including two-dimensional coordinates and signal intensity, so as to generate a four-dimensional tensor including the two-dimensional coordinates, the signal intensity, and the spectral band factors, and may perform preprocessing on the hyperspectral image on the basis of the four-dimensional tensor.

In the exemplary embodiment of step S460, the processor may obtain training images of the cut flowers, designate cut flower quality factors for quality factors to the cut flowers, learn the training images in order to detect respective objects for the variety and the quality factors of the cut flowers, extract object detection item scores to indicate object detection items as the scores on the basis of learning results, and create a cut flower lifespan prediction model in order to predict the vase life of cut flowers on the basis of the object detection item scores.

In the exemplary embodiment of step S460, the processor may generate a bounding box for a specific spot of the cut flowers included in the hyperspectral image and thermal image, extract features of the cut flowers within the bounding box, determine an abnormal state of the cut flowers on the basis of the variety and features of the cut flowers, and output a lifespan prediction value for the vase life of cut flowers on the basis of the abnormal state and lifespan impact factors of the cut flowers.

In the exemplary embodiment of step S460, the hyperspectral image may include RGB information including red, green, and blue, infrared information, and ultraviolet information. The processor may obtain a first hyperspectral image for a first variety sensed by the hyperspectral camera among a plurality of plant varieties, convert the first hyperspectral image into frequency data in frequency bands, and apply a first band-pass filter corresponding to the first variety to the frequency data, so that feature values representing features of each band in the first hyperspectral image may be post-processed.

In step S470, the system 100 may classify the cut flowers on the basis of the predicted vase life of cut flowers.

Figure 5:
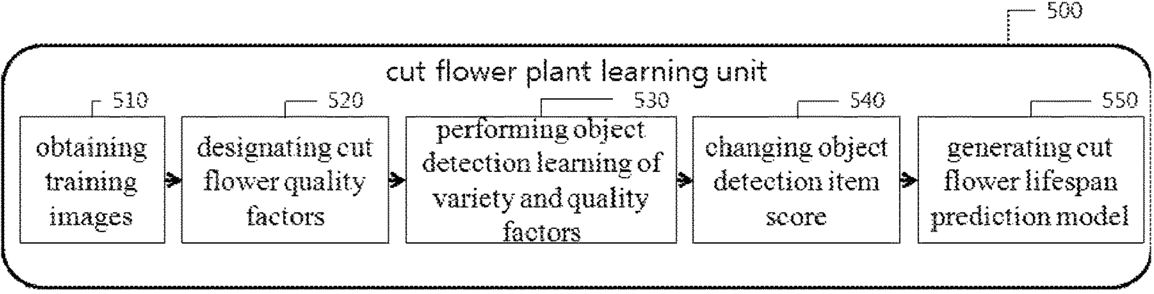
FIG. 5 is a block diagram illustrating a cut flower plant learning unit of the present disclosure.

FIG. 5 is a block diagram illustrating a cut flower plant learning unit of the present disclosure.

Referring to FIG. 5, in step 510, the cut flower plant learning unit 500 may obtain training images for the cut flowers. In step 520, the cut flower plant learning unit 500 may designate cut flower quality factors for quality factors in the cut flowers. In step 530, the cut flower plant learning unit 500 may perform object detection learning of objects such as a variety and quality factors. For example, the cut flower plant learning unit 500 may learn the training images by using an artificial intelligence model in order to detect respective objects for the variety and the quality factors of the cut flowers. In step 540, the cut flower plant learning unit 500 may change an object detection item score. For example, the cut flower plant learning unit 500 may extract object detection item scores to indicate items of detecting the objects as scores on the basis of learning results, and change the object detection item score. In step 550, the cut flower plant learning unit 500 may generate a cut flower lifespan prediction model. For example, the cut flower plant learning unit 500 may create the cut flower lifespan prediction model for predicting the vase life of cut flowers on the basis of the object detection item scores.

Figure 6:
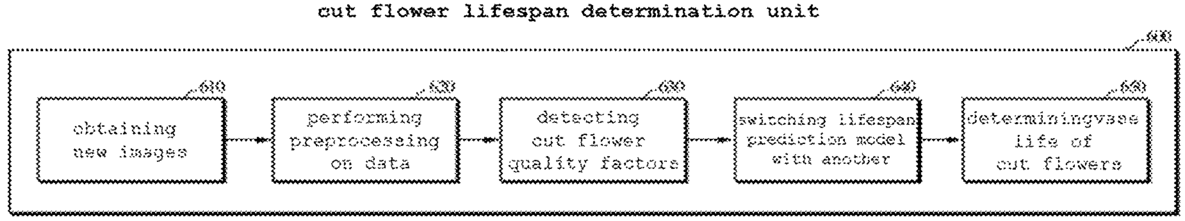
FIG. 6 is a block diagram illustrating a cut flower lifespan determination unit of the present disclosure.

FIG. 6 is a block diagram illustrating a cut flower lifespan determination unit of the present disclosure.

Referring to FIG. 6, in step 610, the cut flower lifespan determination unit 600 may obtain new images of the cut flowers. In step 620, the cut flower lifespan determination unit 600 may perform preprocessing on data of the new images. In step 630, the cut flower lifespan determination unit 600 may detect cut flower quality factors of the cut flowers on the basis of the preprocessed data. In step 640, the cut flower lifespan determination unit 600 may switch the lifespan prediction model with another on the basis of the cut flower quality factors. In step 650, the cut flower lifespan determination unit 600 may predict the vase life of the cut flowers by using a lifespan prediction model.

Figure 7:
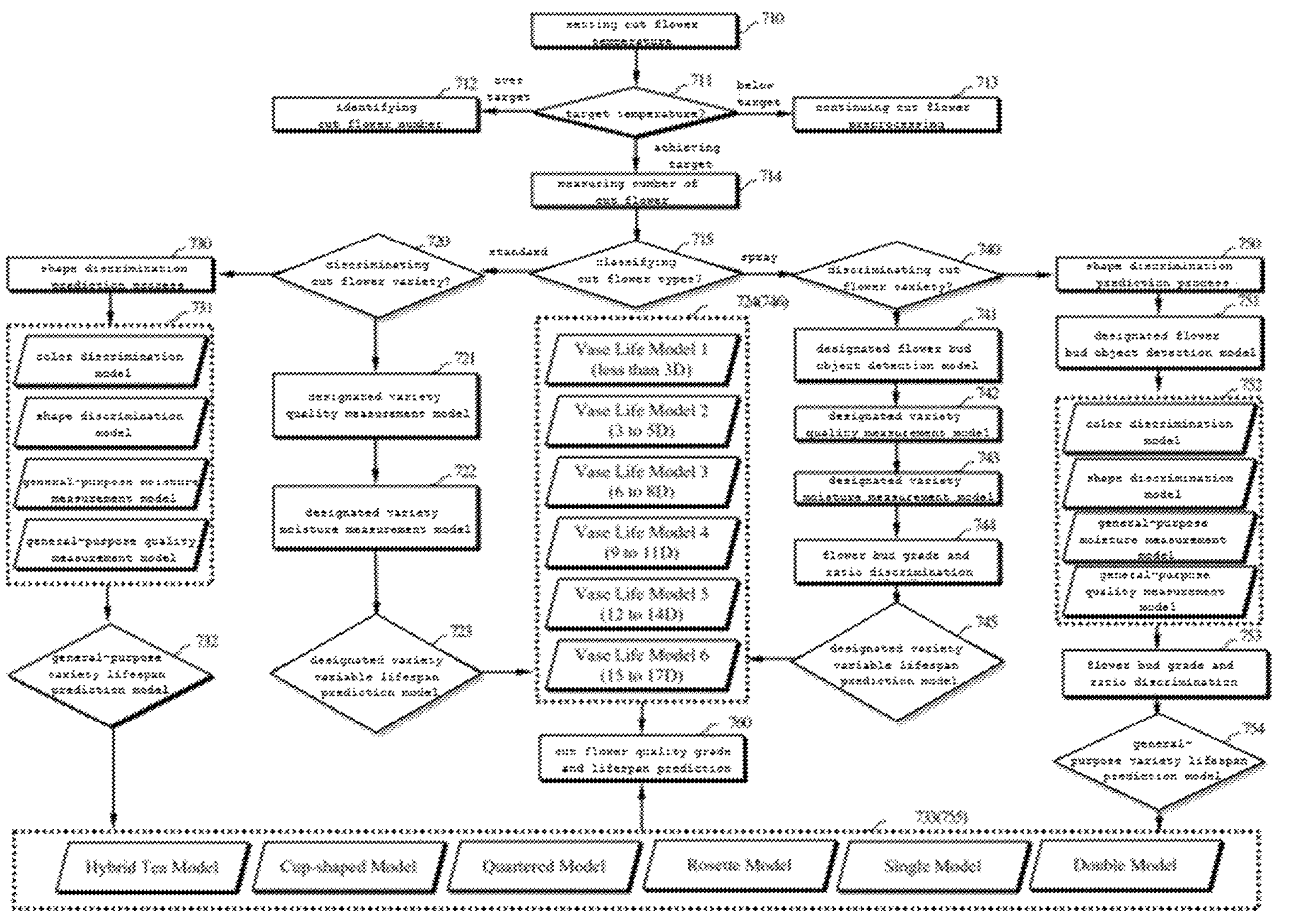
FIG. 7 is a flowchart illustrating a method according to another exemplary embodiment of the present disclosure.

FIG. 7 is a flowchart illustrating a method according to another exemplary embodiment of the present disclosure.

Referring to FIGS. 1 and 7, in step S710, a system 100 may set a temperature of cut flowers. In step S711, the system 100 may determine whether the temperature of the cut flowers has reached a target temperature. When there exist cut flowers having reached an abnormal temperature in a group, the system 100 may identify a cut flower number in step S712. When a temperature of cut flowers does not reach the target temperature, that is, when a temperature of the cut flower is below the target temperature, the system 100 may continue to perform preprocessing on the cut flowers in step S713. When the temperature of the cut flowers reaches the target temperature, the system 100 may measure the number of the cut flowers in step S714. In step S715, the system 100 may classify cut flower types.

When a cut flower type is "standard", the system 100 may use a cut flower variety model 331 to discriminate the cut flower variety in step S720. The standard variety may mean to have one stem and one flower bud. When the cut flower variety is discriminable, the system 100 may measure the quality of the cut flowers by using a cut flower quality model 332 for the designated variety in step S721. In step S722, the system 100 may measure moisture of the cut flowers by using a cut flower moisture model 333 for the designated variety. In step S723, the system 100 may select or change a lifespan prediction model 334 for the designated variety. In step S724, Vase life model 1 may be a model for cut flowers having the vase life of less than three days, Vase life model 2 may be a model for cut flowers having the vase life of three to five days, Vase life model 3 may be a model for cut flowers having the vase life of six to eight days, Vase life model 4 may be a model for cut flowers having the vase life of nine to eleven days, Vase life model 5 may be a model for cut flowers having the vase life of twelve to fourteen days, and Vase life model 6 may be a model for cut flowers having the vase life of fifteen to seventeen days. However, this is not limited thereto. When a cut flower variety is unable to be identified, the system 100 may perform a process of identifying and predicting a shape of the cut flowers in step S730. Specifically, in step S731, the system 100 may use a color discrimination model, a shape discrimination model, a general-purpose moisture measurement model, and/or a general-purpose quality measurement model. In step S732, the system 100 may use a general-purpose variety lifespan prediction model. Specifically, in step S733, the system 100 may use a Hybrid tea model, a Cup-shaped model, a Single model, a Double model, a Quartered model, or a Rosette model, etc., depending on the seasonal influence of lifespan.

When a cut flower type is "spray", the system 100 may use the cut flower variety model 331 to discriminate a cut flower variety. The spray variety may mean to have multiple flower buds on one stem. When the cut flower variety is discriminable, the system 100 may detect objects for flower buds of the designated variety by using an object detection model in step S741. In step S742, the system 100 may measure the quality of the cut flowers by using the cut flower quality model 332 for the designated variety. In step S743, the system 100 may measure moisture of the cut flowers by using the cut flower moisture model 333 for the designated variety. In step S744, the system 100 may discriminate a grade and rate of the flower buds of the designated variety. Steps S745 and S746 may be the same as steps S723 and S724. Detection models may be different from each other. When a cut flower variety is unable to be discriminated, the system 100 may perform the process of discriminating and predicting a shape of the cut flowers in step S750. A trained model may be used for the shape of the flower buds. For example, in a case of a sequence for detecting a shape of flower buds, it may be in order of shape, color, stem or calyx, etc. In step S751, the system 100 may use an object detection model designated for the flower buds of the cut flowers, and specifically in step S752, the system 100 may use a color discrimination model, a shape discrimination model, a general-purpose moisture measurement model, and/or a general-purpose quality measurement model. In step S753, the system 100 may discriminate a grade and rate of the flower buds of the designated variety by using the color discrimination model, the shape discrimination model, the general-purpose moisture measurement model, and/or the general-purpose quality measurement model. Grades of flower buds may include, for example, Grade A, Grade B, Grade C, etc. A ratio of flower buds may be a ratio for the grade of the flower buds described above (e.g., Grade A, Grade B, Grade C, etc.). In step S754, the system 100 may use a general-purpose variety lifespan prediction model. Specifically, in step S755, the system 100 may use a Hybrid tea model, a Cup-shaped model, a Single model, a Double model, a Quartered model, or a Rosette model. In step S760, the system 100 may predict a quality grade and vase life of the cut flowers.

Figure 8:
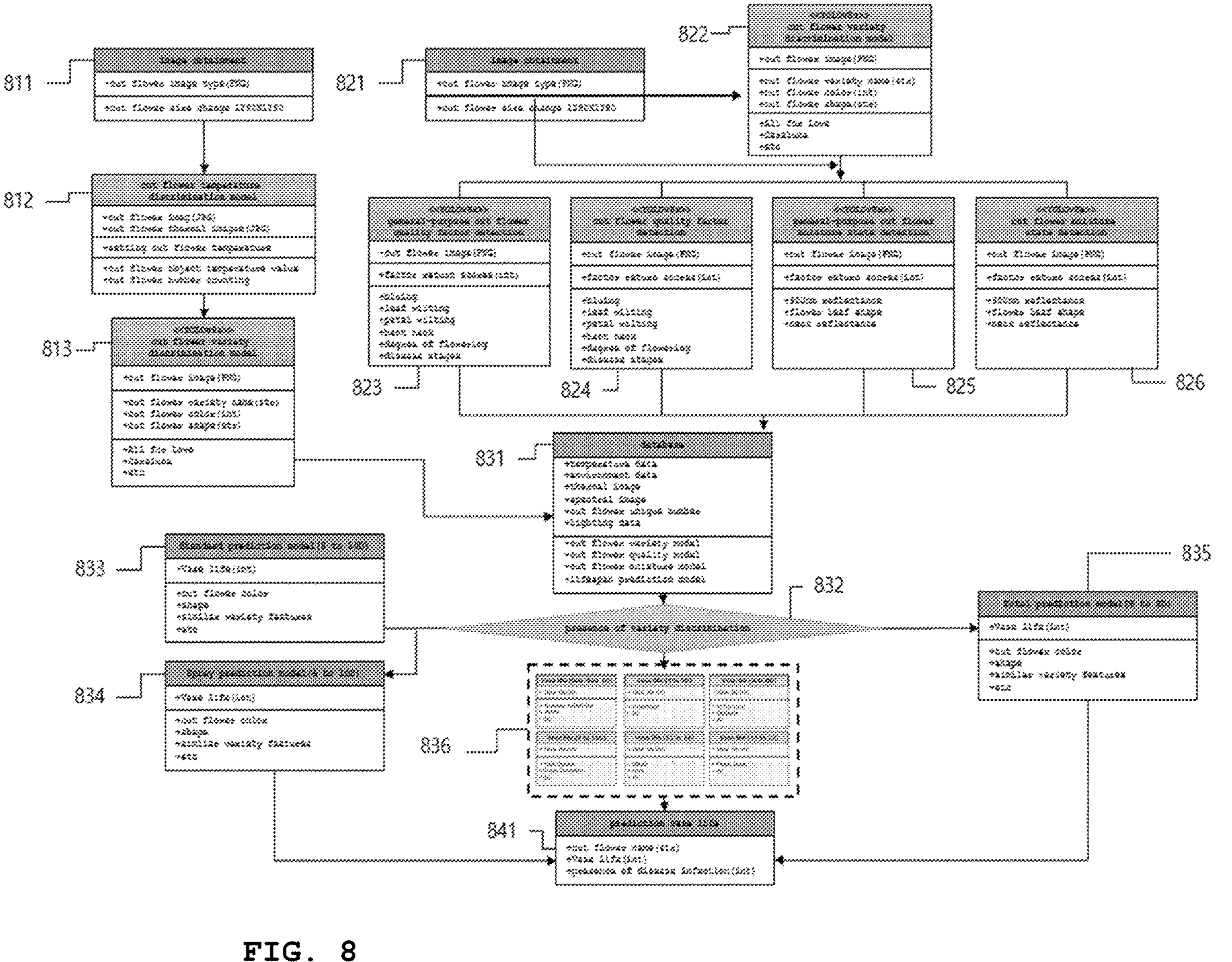
FIG. 8 is a data design drawing for variety discrimination and object detection according to the exemplary embodiment of the present disclosure.

FIG. 8 is a data design drawing for variety discrimination and object detection according to the exemplary embodiment of the present disclosure.

Referring to FIG. 8, in step S811, the system 100 may obtain a cut flower image. For example, a type of cut flower image may be PNG, and a variation of cut flower size may be 1280×1280, but these are not limited thereto. In step S812, the system 100 may discriminate and set temperature of cut flowers from a cut flower image and a cut flower thermal image by using a cut flower temperature discrimination model, and may calculate object temperature values of the cut flowers and count the number of cut flowers. In step S813, the system 100 may discriminate a cut flower variety name, a cut flower color, and a cut flower shape from the cut flower image by using a cut flower variety discrimination model. The information to be discriminated after step S813 may be stored in a database in step S831. Steps S811 to S813 may be steps performable in a case where a cut flower variety is discriminable in FIG. 7.

In step S821, the system 100 may obtain a cut flower image. In step S822, the system 100 may discriminate a cut flower variety name, a cut flower color, and a cut flower shape from the cut flower image by using the cut flower variety discrimination model. In step S823, the system 100 may detect general-purpose cut flower quality factors by calculating factor return scores on the basis of the cut flower image. For example, the general-purpose cut flower quality factors may include bluing, leaf wilting, petal wilting, bent neck, degree of flowering, disease stages, etc. However, this is not limited thereto. In step S824, the system 100 may detect cut flower quality factors by calculating factor return scores on the basis of the cut flower image. For example, the cut flower quality factors may include the bluing, leaf wilting, petal wilting, bent neck, degree of flowering, and disease stages. However, this is not limited thereto. In step S825, the system 100 may detect general-purpose cut flower moisture states by calculating the factor return scores on the basis of the cut flower image. For example, the general-purpose cut flower moisture states may include 900 nm reflectance, petal shapes, flower neck reflectance, etc. However, this is not limited thereto. In step S826, the system 100 may detect cut flower moisture states by calculating factor return scores on the basis of the cut flower image. For example, the cut flower moisture states may include 900 nm reflectance, petal shapes, flower neck reflectance, etc. However, this is not limited thereto. Steps S821 to S826 may be steps performable in a case where the cut flower variety is discriminable in FIG. 7. The information to be discriminated after step S823 to S826 may be stored in the database in step S831. The factor return scores may be referred to as lifespan scores, and in a case of an indicator for calculating the lifespan scores, the indicator may be confirmed through an NIR-based moisture state, an ROI of a specific disease region, or high reflectance of a specific wavelength range on the basis of hyperspectral data having relatively high resolution. Each score may be summed on the basis of LUT or score ratios. In step S831, the system 100 may store temperature data, environmental data, thermal images, spectral images, cut flower unique numbers, and lighting data in a database. In addition, the system 100 may store the cut flower variety model, the cut flower quality model, the cut flower moisture model, and the lifespan prediction model in the database.

In step S832, the system 100 may discriminate a cut flower variety. The system 100 may use a standard prediction model in step S833, a spray prediction model in step S834, and a total prediction model in step S835. In step S833, visible and near-infrared may be used for cut flower colors. A band of the visible and near-infrared may be about 400 nm. Meanwhile, in step S836, the system 100 may use a designated variety variable lifespan prediction model. In step S841 after steps S833 to S836, the system 100 may predict the vase life of cut flowers. In addition, the system 100 may predict the vase life of the cut flowers, cut flower names, vase life, and the presence or absence of disease infection.

Figure 9:
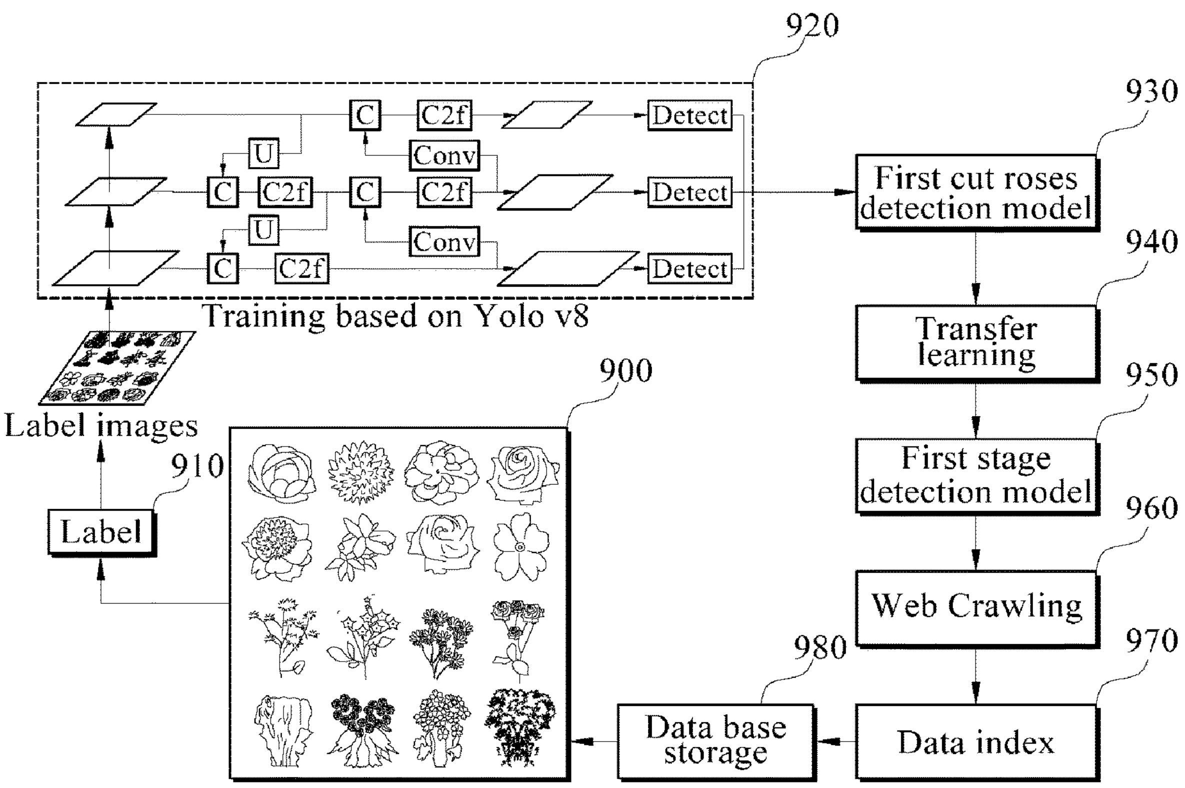
FIG. 9 is a view illustrating learning of a variety discrimination and object detection model according to the exemplary embodiment of the present disclosure.

FIG. 9 is a view illustrating learning of a variety discrimination and object detection model according to the exemplary embodiment of the present disclosure.

Referring to FIG. 9, a cut flower image 900 may be provided to the system 100. RGB with similar colors may be selected in the cut flower image 900, a bounding box may be set up to a stem or a flower bud on the basis of an area ratio of segmentation, and a background excluding cut flowers may be removed in the cut flower image 900. The cut flower image 900 to be used for learning may be an image captured from a sideview perspective. In order to consider applicability to a model from the cut flower image 900, a main color and a sub color may be distinguished. The system 100 may perform labeling 910 on the cut flower image 900. A label image may be a thermal image with a label added. The system 100 may train an artificial intelligence model 920 by using label images. Through a training process, a first cut flower detection model 930 of the present disclosure may be trained with the label images. The first cut flower detection model 930 may be a model for detecting objects, e.g., flower buds, leaves, and/or a reference plate of cut flowers, from a thermal image. The training process may include, for example, a training technique based on YOLO (You Only Look Once) v8. YOLO (You Only Look Once) is an object detection model, which is applicable to an artificial intelligence disease determination model. The training process may include three layers of a pyramid structure for detection, and objects may be finally detected by detecting features from each layer. The number of layers in the training process is not limited to the description above. After the training is completed, the system 100 may generate a first cut flower detection model 930. The first cut flower detection model 930 learns through transfer learning 940, so that a first stage detection model 950 may be created. The system 100 may perform web crawling 960 on a network. The system 100 may set a data index 970. The system 100 may store information in a database 980.

Figure 10:
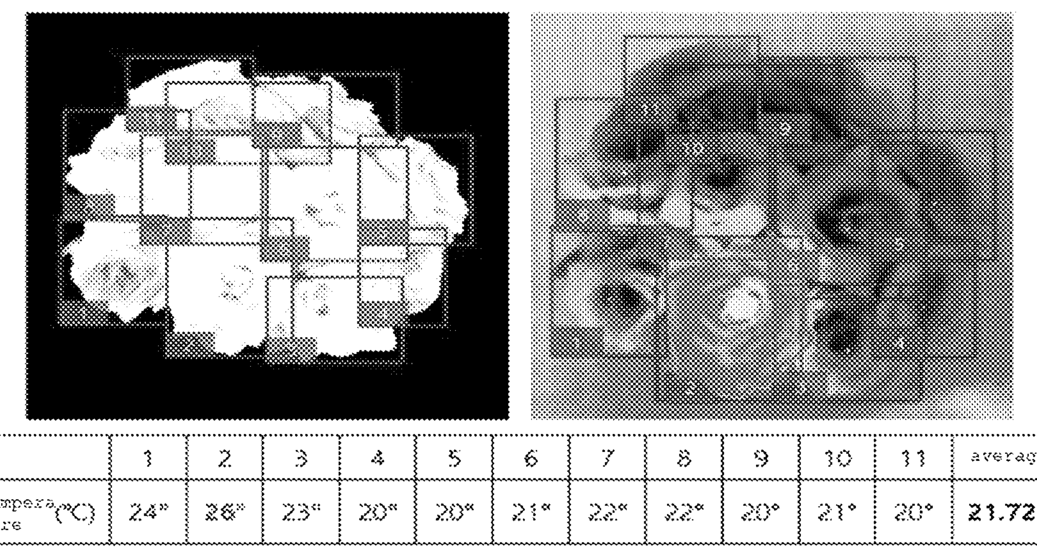
FIG. 10 is a view illustrating a preprocessing system according to the exemplary embodiment of the present disclosure.

FIG. 10 is a view illustrating a preprocessing system according to the exemplary embodiment of the present disclosure.

Referring to FIG. 10, the system 100 may perform classification by using bounding boxes through a track model, track multiple objects moving over time, and designate numbers and the number of cut flowers by counting the numbers. The system 100 may track an object having a large difference between an average temperature of a bunch of cut flowers and an average temperature retrieved from the database. The system 100 may track the object by using a temperature value three to four degrees higher than the average temperature as a determination criterion. In a cut flower image including the cut flowers, a plurality of bounding boxes, for example, eleven bounding boxes as shown in FIG. 10 may be set. The temperatures of the cut flowers for respective bounding boxes may be measured partially. For example, a temperature of a portion of the cut flowers included within a first bounding box (see "1" in FIG. 10) may be 24 degrees. Similarly, temperatures of portions of the cut flowers respectively included in second to eleventh bounding boxes (see "2" to "11" in FIG. 10) may be measured as shown in FIG. 10. However, the temperatures shown in FIG. 10 are only illustrative, and the exemplary embodiment is not limited to what is shown in FIG. 10.

Figure 11:
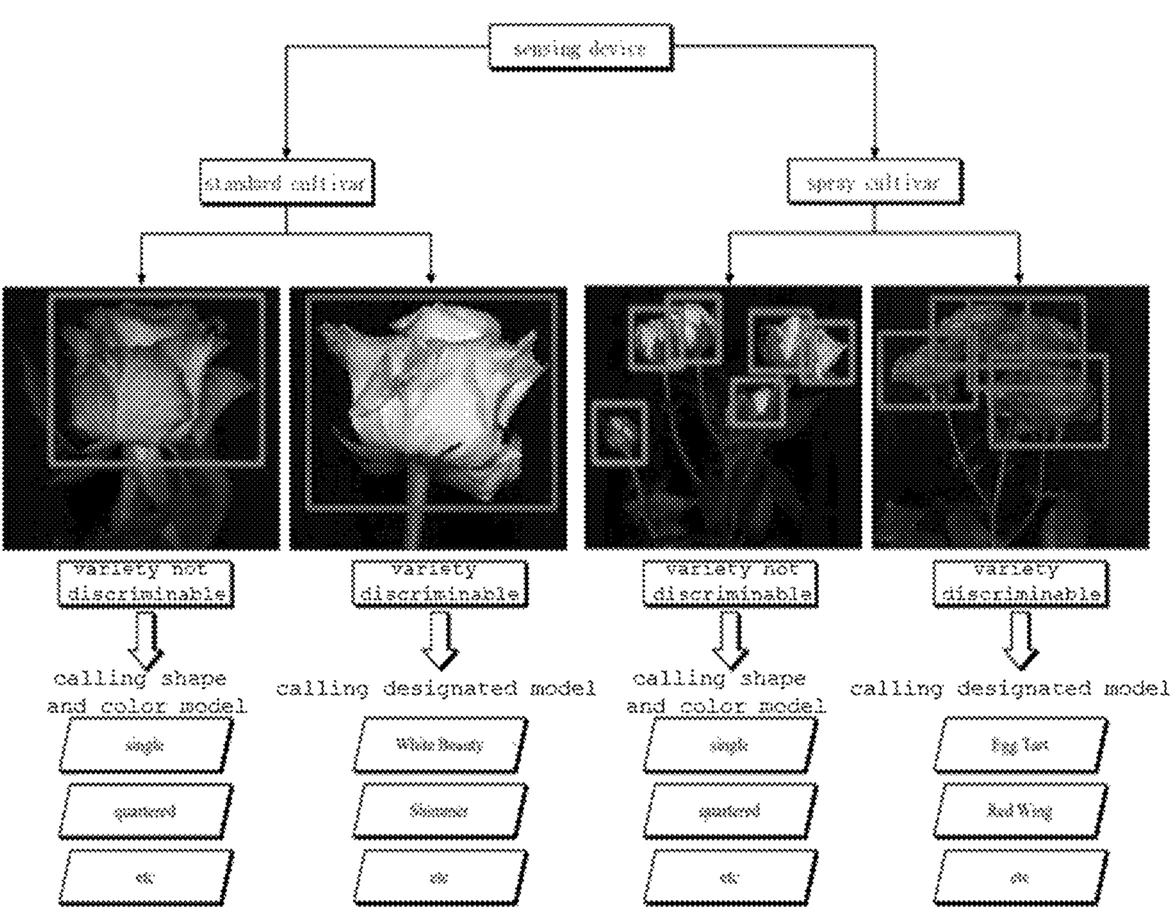
FIG. 11 is a view illustrating an example of calling the variety discrimination and object detection model according to the exemplary embodiment of the present disclosure.

FIG. 11 is a view illustrating an example of calling the variety discrimination and object detection model according to the exemplary embodiment of the present disclosure.

Referring to FIG. 11, the system 100 may determine whether a cut flower variety included in a cut flower image is discriminable or not on the basis of a specific bounding box established in the cut flower image. For example, in a cut flower image showing a standard cultivar, discriminating a variety is impossible for some cut flowers, but discriminating a variety is possible for other cut flowers. In a case where a cut flower variety is not discriminable from the cut flower image showing the standard cultivar, the system 100 may call a shape model and a color model. In addition, the system 100 may predict the vase life of cut flowers by using a general-purpose variety lifespan prediction model (e.g., the Single model, Quartered model, etc.). In a case where a cut flower variety is discriminable from the cut flower image showing the standard cultivar, the system 100 may call a designated model. In addition, the system 100 may predict the vase life of cut flowers by using the designated model (e.g., the White beauty model, Shimmer model, etc.). For another example, in a cut flower image showing a spray cultivar, discriminating a variety is impossible for some cut flowers, but discriminating a variety is possible for other cut flowers. In a case where a cut flower variety is not discriminable from the cut flower image showing the spray cultivar, the system 100 may call the shape model and the color model. In addition, the system 100 may predict the vase life of cut flowers by using the general-purpose variety lifespan prediction model (e.g., the Single model, Quartered model, etc.). In the case where the cut flower variety is not discriminable from the cut flower image showing the spray cultivar, the system 100 may call a designated model. In addition, the system 100 may predict the vase life of cut flowers by using the designated model (e.g., the Egg tart model, Red wing model, etc.).

Figure 12:
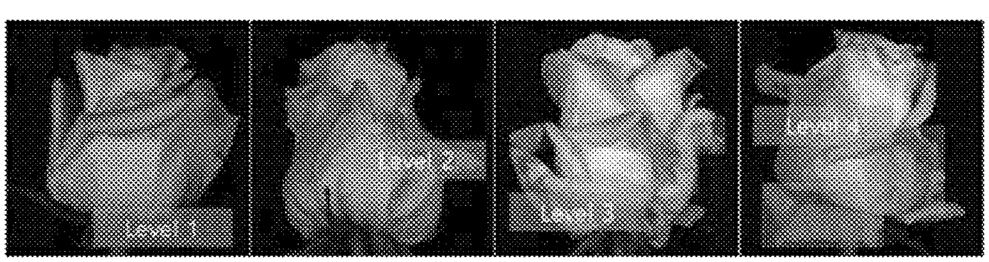
FIG. 12 is a view illustrating an example of quality factor object detection and score assignment according to the exemplary embodiment of the present disclosure.
Figure 12:
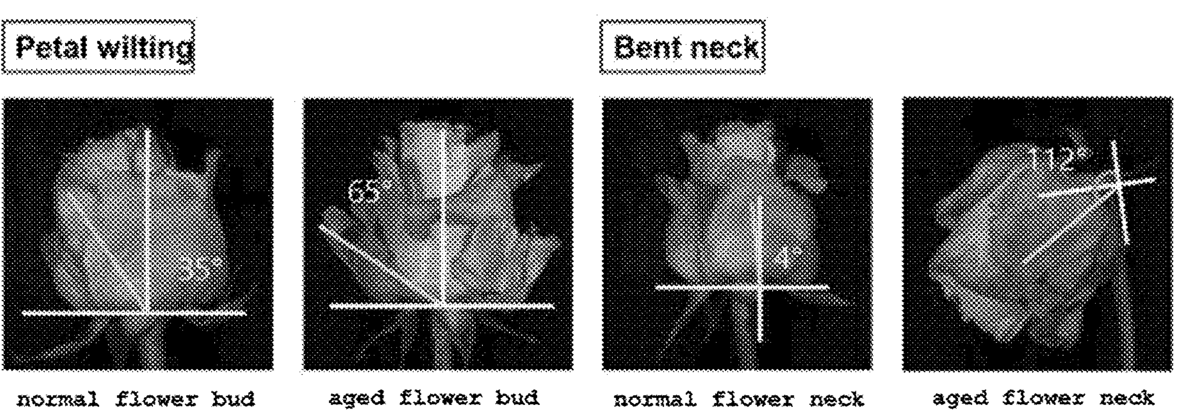

FIG. 12 is a view illustrating an example of quality factor object detection and score assignment according to the exemplary embodiment of the present disclosure.

Referring to FIG. 12, in a case of cut flower images showing cut flowers infected with a gray mold disease, scores may be assigned according to levels expressing degrees of infection with the gray mold disease. In a case of cut flower images showing petal wilting, whether a cut flower has aged or not may be determined on the basis of an angle between a highest part of outer leaves of a flower bud relative to a sepal of the flower bud in each cut flower image. In a case of cut flower images showing a bent of a flower stalk (i.e., "bent neck"), whether a cut flower has aged or not may be determined on the basis of an angle between leaves of a flower bud relative to a calyx of the flower bud in each cut flower image.

Figure 13:
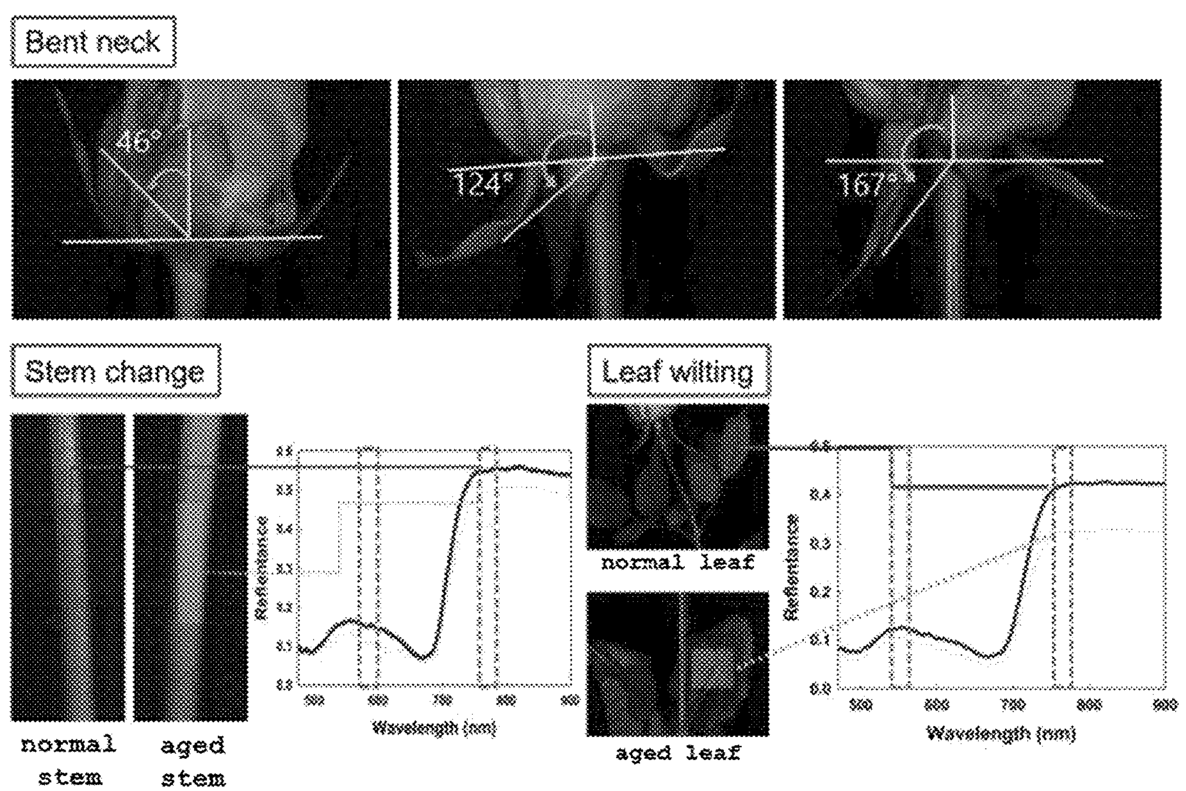
FIG. 13 is a view illustrating reflectance depending on quality factor objects and qualities thereof according to the exemplary embodiment of the present disclosure.
Figure 14:
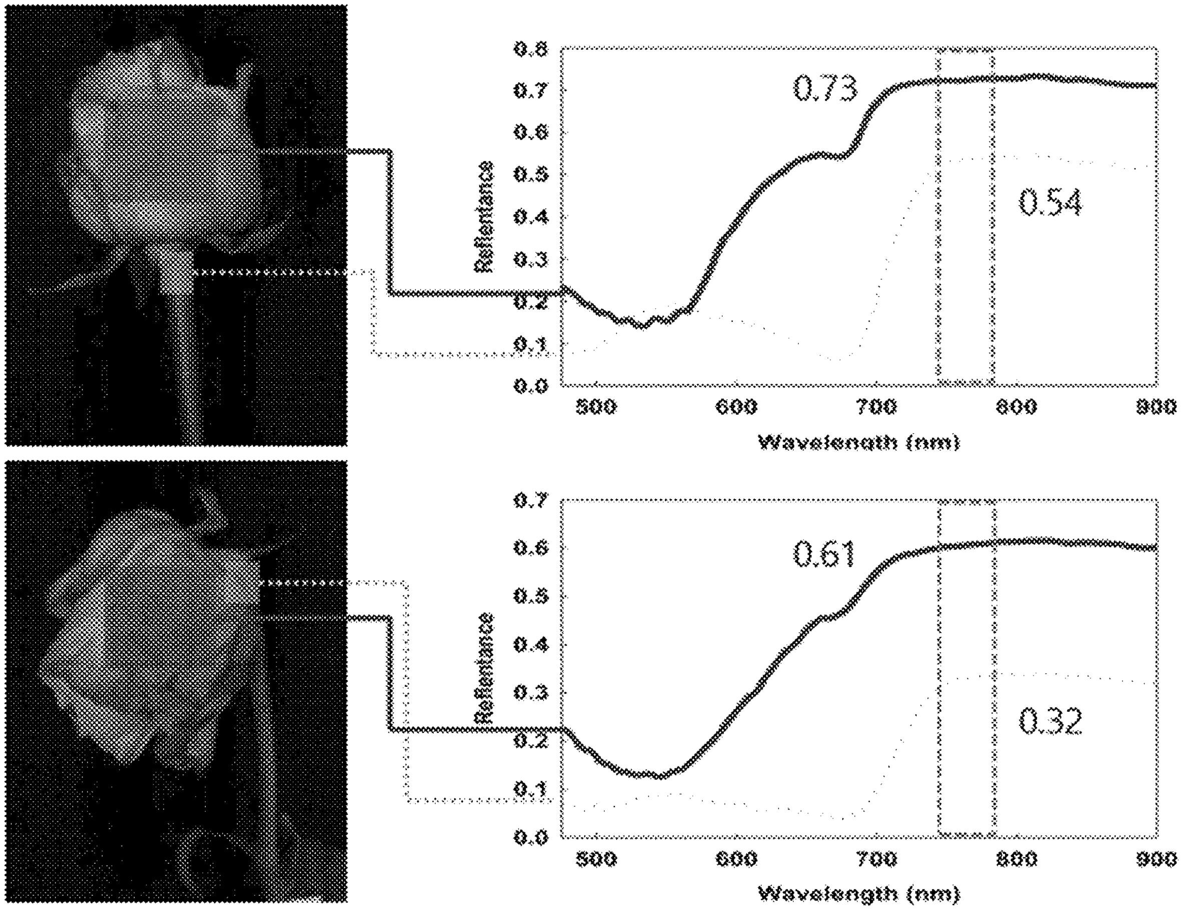
FIG. 14 is a view illustrating spectrum changes depending on cut flower aging states.
Figure 15:
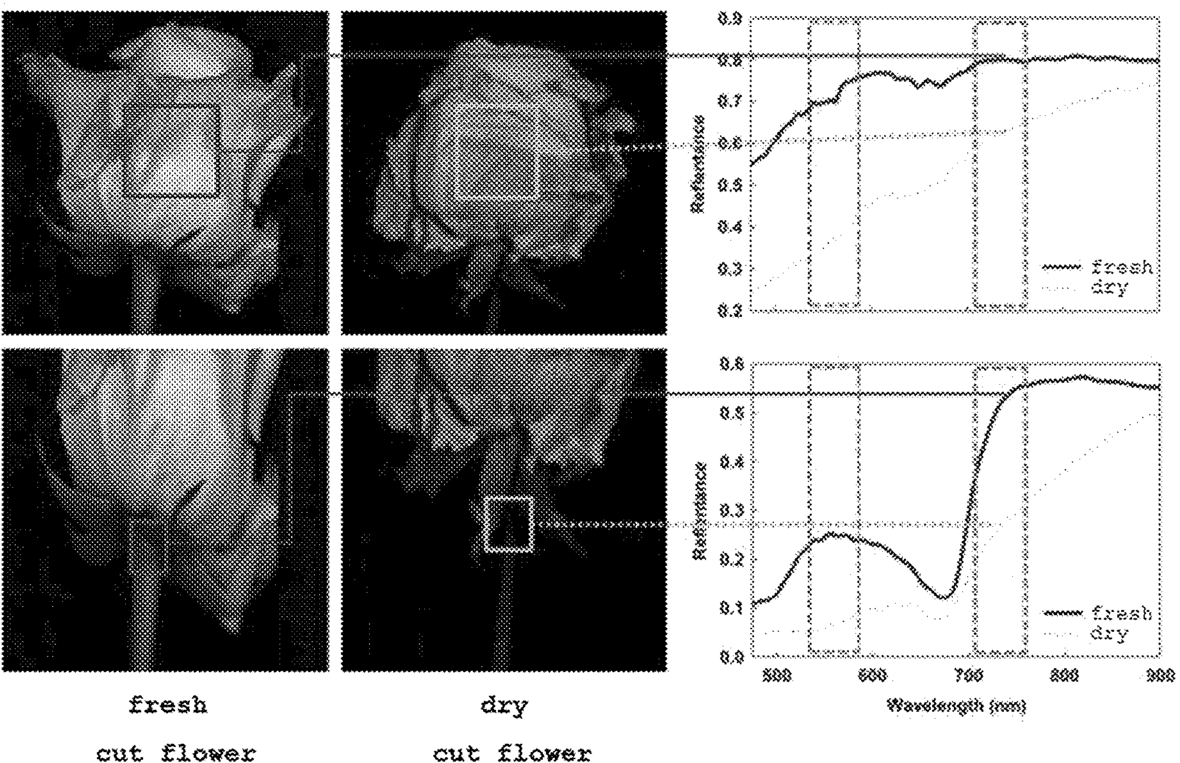
FIG. 15 is a view illustrating spectrum changes depending on cut flower moisture states.

FIG. 13 is a view illustrating reflectance depending on quality factor objects and qualities thereof according to the exemplary embodiment of the present disclosure. FIG. 14 is a view illustrating spectrum changes depending on cut flower aging states. FIG. 15 is a view illustrating spectrum changes depending on cut flower moisture states Referring to FIG. 13, when each cut flower image showing stem change among the cut flower images showing the bent of the flower stalks (i.e., the bent neck) is referred, no line appears on a stem, but spectral bands in green corresponding to chlorophyll may appear in a normal stem case. Meanwhile, in an aging stem case, reflectance is relatively low, and an absolute value of reflectance of yellow or green is evaluable. Meanwhile, referring to a cut flower image showing leaf wilting among the cut flower images showing the bent of the flower stalk (i.e., the bent neck), respective graphs illustrating a relationship between wavelength and reflectance of a normal leaf and that of an aged leaf may be represented exemplarily as shown in FIG. 13. Referring to FIG. 14, reflectance of a flower bud or petal of a normal cut flower may be about 0.73, and reflectance of a lower part of the flower bud of the normal cut flower may be about 0.54. Meanwhile, reflectance of a flower bud or petal of an aging cut flower may be about 0.61, and reflectance of a lower part of the flower bud of the aging cut flower may be about 0.32 which is lower than a threshold value. However, this is not limited thereto. Referring to FIG. 15, the reflectance of fresh cut flowers may be higher than that of dried cut flowers.

Figure 16:
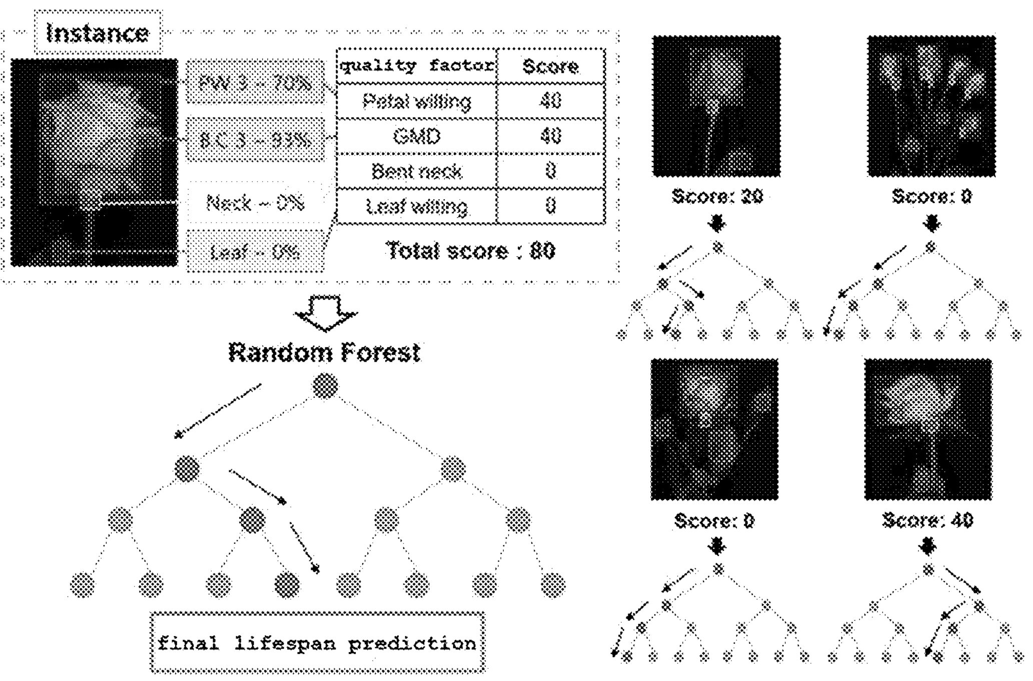
FIG. 16 is a structural view of a cut flower lifespan prediction model according to the exemplary embodiment of the present disclosure.

FIG. 16 is a structural view of a cut flower lifespan prediction model according to the exemplary embodiment of the present disclosure. Referring to FIG. 16, the cut flower lifespan prediction model according to the exemplary embodiment may be implemented by using a random forest algorithm. A bounding box for each part of a cut flower image may be set, a quality factor for each bounding box may be determined, and a score for each quality factor may be calculated. In addition, the vase life of cut flowers may be finally predicted through the random forest algorithm.

Figure 17:
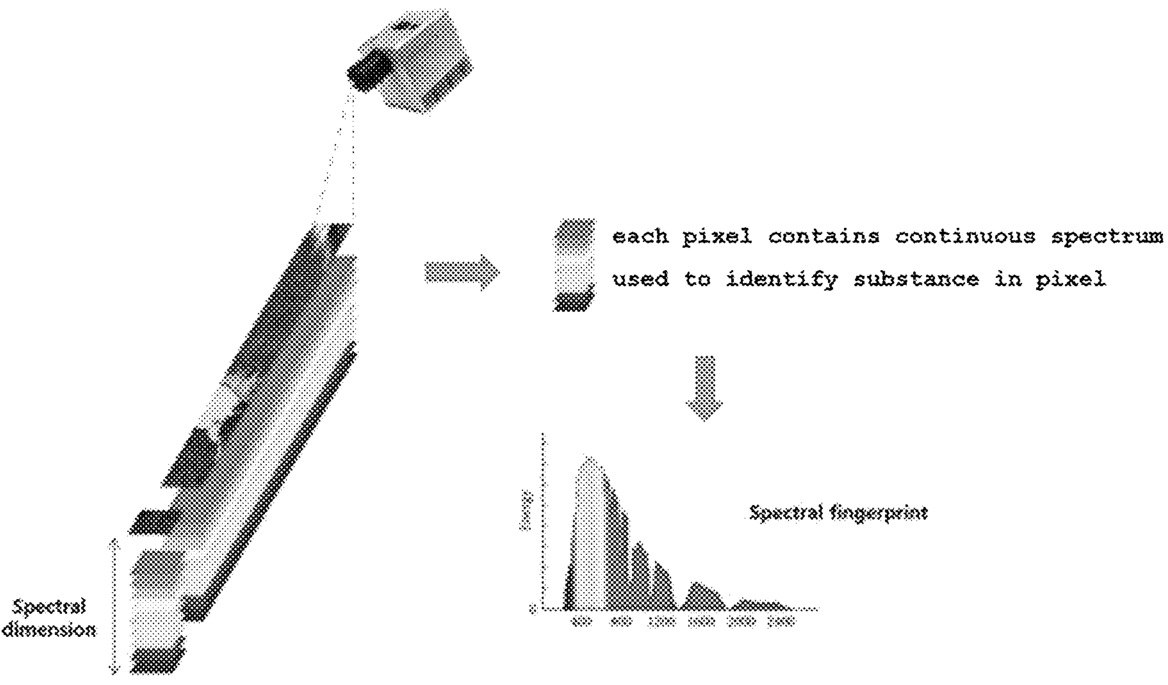
FIG. 17 is a view illustrating an exemplary embodiment of extracting spectral features for each band and performing clustering by using a hyperspectral camera.

FIG. 17 is a view illustrating an exemplary embodiment of extracting spectral features for each band and performing clustering by using a hyperspectral camera.

Referring exemplary a to FIG. 17, in some embodiments, photographing device may include: a thermal imaging camera for generating a thermal image; and a hyperspectral camera for generating a hyperspectral image including RGB information including red, green, and blue, infrared information, and ultraviolet information. In addition, a processor may receive the thermal image from the thermal imaging camera, receive the hyperspectral image including the RGB information including red, green, and blue, infrared information, and ultraviolet information from the hyperspectral camera, obtain a first hyperspectral image for a first variety sensed by the hyperspectral camera among a plurality of plant varieties, convert the first hyperspectral image into frequency data in frequency bands, and apply a first band-pass filter corresponding to the first variety to the frequency data, so that feature values representing features of each band in the first hyperspectral image may be post-processed. The hyperspectral camera and thermal imaging camera may be used redundantly in order to achieve complementarity for complementing performance. For example, primarily, whether an abnormality exists or not may be diagnosed through the thermal imaging camera, and secondarily, verification operation may be performed on the basis of IR measurement results of the hyperspectral camera. Meanwhile, the hyperspectral camera and thermal imaging camera may be used compatibly in order to achieve the complementarity for the complementing performance. For example, processing priority may be given between the hyperspectral camera and thermal imaging camera.

In one of some exemplary embodiments, the processor may generate a first feature map by inputting frequency data to a first artificial intelligence model included in a first learning model for processing a thermal image, and may output a probability value for temperature of cut flowers by inputting the first feature map into a second artificial intelligence model including a plurality of layers. An optimal method may be used for intensity fitting, and interpolation may be applied to handle overshooting and undervalues.

Figure 18:
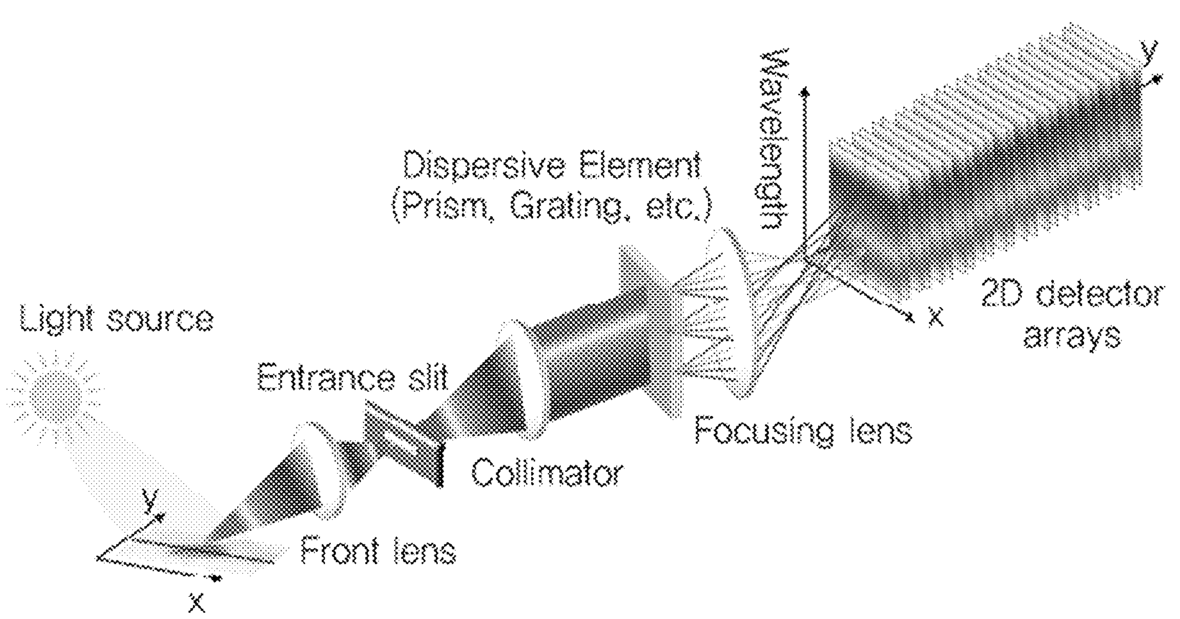
FIG. 18 is a view illustrating an exemplary embodiment of performing preprocessing on an image captured by the hyperspectral camera.

FIG. 18 is a view illustrating an exemplary embodiment of performing preprocessing on an image captured by the hyperspectral camera.

Referring to FIG. 18, in some exemplary embodiments, the processor may add spectral band factors reflected with features of spectral bands to a three-dimensional tensor including two-dimensional coordinates and signal intensity, so as to generate a four-dimensional tensor including the two-dimensional coordinates, the signal intensity, and the spectral band factors and to perform preprocessing on a hyperspectral image on the basis of the four-dimensional tensor.

In one of some exemplary embodiments, the processor may learn the four-dimensional tensor generated for a thermal image by using a network function. The network function according to the exemplary embodiment may be CNN.

In another exemplary embodiment among some exemplary embodiments, the processor may learn a three-dimensional tensor generated for a thermal image by using a first network, and relearn a four-dimensional tensor, in which weights corresponding to the spectral band factors are given to the three-dimensional tensor, by using the first network. Artificial intelligence networks according to another exemplary embodiment may be CNN, LSTM, and RNN.

In a yet another exemplary embodiment among some exemplary embodiments, the processor as a transformer may perform first learning on a three-dimensional tensor generated for a thermal image by using a first network, perform second learning on a one-dimensional tensor including spectral band factors by using the first network, generate a latent vector (or z) by converting respective results of the first and second learning into a latent space, and decode the latent vector to restore the thermal image and an image for frequency data.

Figure 19:
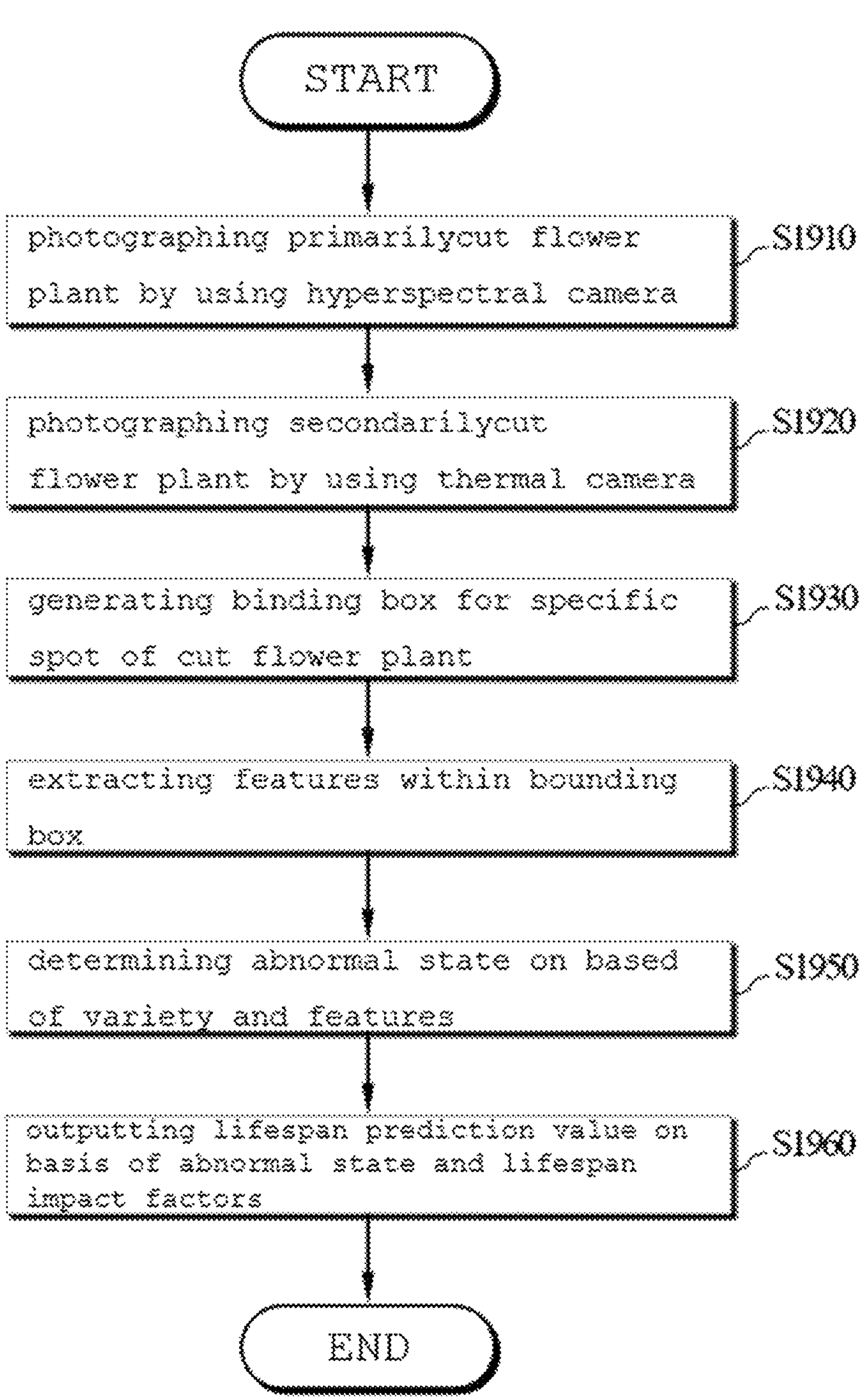
FIG. 19 is a flowchart illustrating a technology for discriminating a cut flower variety by using a specific factor and a step-by-step algorithm for detecting a disease factor or predicting a lifespan.

FIG. 19 is a flowchart illustrating a technology for discriminating a cut flower variety by using a specific factor and a step-by-step algorithm for detecting a disease factor or predicting a lifespan.

Referring to FIG. 19, in step S1910, the system 100 may primarily photograph a cut flower plant by using a hyperspectral camera. For example, a photographing device may first generate a hyperspectral image. In step S1920, the system 100 may secondarily image the cut flower plant by using a thermal imaging camera. For example, the photographing device may generate a thermal image after generating the hyperspectral image. In step S1930, the system 100 may generate a bounding box for a specific spot of the cut flower plant. For example, the processor may generate a bounding box for a specific spot of cut flowers included in the hyperspectral image and thermal image. In step S1940, the system 100 may extract features within the bounding box. For example, the processor may extract features of the cut flowers within the bounding box. In step S1950, the system 100 may determine an abnormal state on the basis of a variety and features. For example, the processor may determine the abnormal state of the cut flowers on the basis of the cut flower variety and the features of the cut flowers. In step S1960, the system 100 may output a lifespan prediction value on the basis of the abnormal state and lifespan impact factors. For example, the processor may output a lifespan prediction value for the vase life of cut flowers on the basis of the abnormal state and the lifespan impact factors of the cut flowers.

Figure 20:
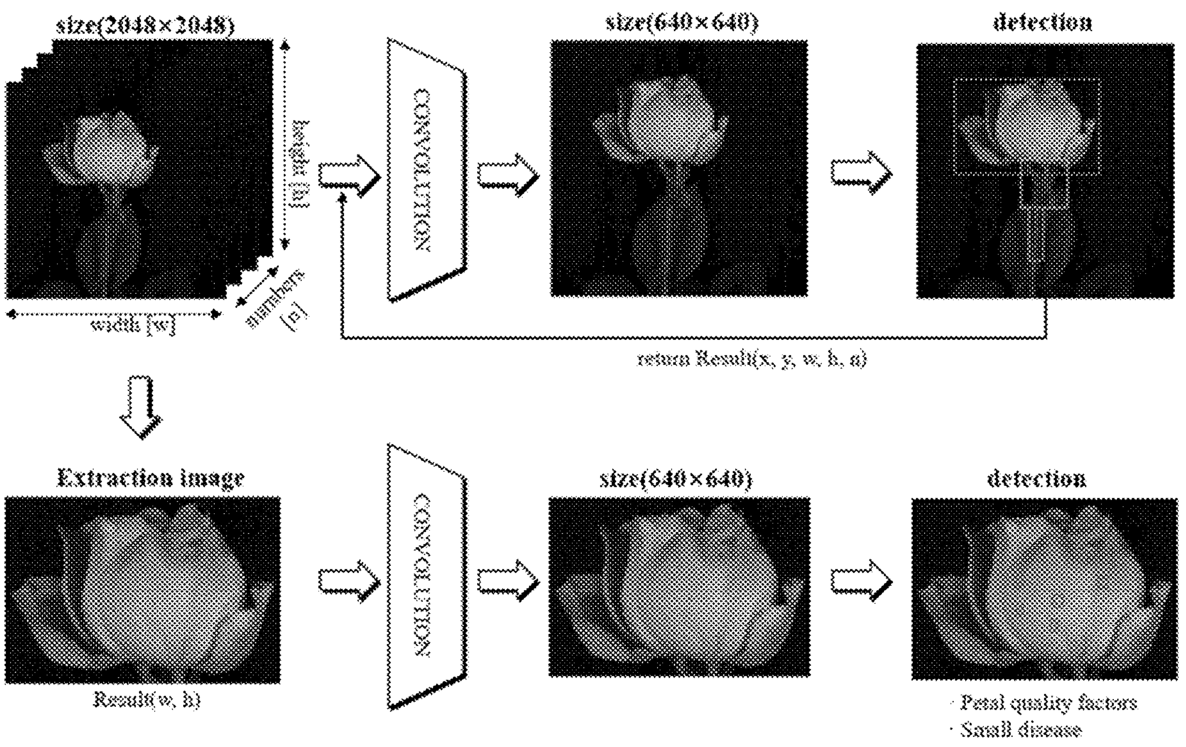
FIG. 20 is a conceptual view illustrating a method of detecting objects through convolution operations according to the present disclosure.

FIG. 20 is a conceptual view illustrating a method of detecting objects through convolution operations.

Referring to FIG. 20, the system 100 may detect objects by performing convolution layer operations or convolution operations on a plurality of pieces of image data.

According to the exemplary embodiment, the plurality of pieces of image data may be input to the system 100. Each piece of image data may be two-dimensional data having a width w, a height h and including pixel information. For example, the size of the image data may have a width of 2048 and height of 2048 of a two-dimensional image. In the present disclosure, the size of width or height may correspond to the number of pixels.

According to the exemplary embodiment, a plurality of n pieces of image data may be input to the system 100 in the form of a data set. The plurality of pieces of image data may be data obtained by photographing one object consecutively or at regular intervals.

According to the example embodiment, the system 100 may perform a convolution operation on each of the plurality of pieces of image data. For example, the system 100 may implement and/or execute machine learning architecture designed to allow input data to pass through convolutional layers on an artificial neural network. For example, the system 100 may generate feature maps by sequentially executing commands according to program code and sequentially performing convolution on pixel values in each of width and height directions of the image data.

According to the exemplary embodiment, the plurality of pieces of image data may be converted into a dimensionally reduced dataset as a result of the convolution operation. For example, the image data having a size of 2048×2048 may be converted to image data having a size of 640×640.

According to the exemplary embodiment, the system 100 may recognize and detect an object of interest (OOI) from the image data having the size of 640×640. For example, the system 100 may display a result of detecting an object of interest (OOI) on the image data in the form of a bounding box.

According to the exemplary embodiment, as the result of detecting the object of interest (OOI), each of parameters (x, y) for a location of the object of interest and image data parameters (w, h, n) may be returned to an input end of a convolution operation. According to the exemplary embodiment, resultant data, i.e., Result (x, y, w, h, n), is fed back in the same size as the image data having a size with the width of 2048 and the height of 2048, and may be used as input data again.

According to the exemplary embodiment, a specific object of interest (e.g., a flower bud or a petal) may be extracted from the plurality of pieces of image data. For example, an extracted image may have an image size equal to a width w and a height h. The system 100 may perform a convolution operation on the extracted image. Since the operation of the system 100 to perform the convolution operation on the extracted image is similar to the operation described above for the plurality of images, the redundant description will be omitted.

According to the exemplary embodiment, the extracted image may be converted into a dimensionally reduced dataset as a result of the convolution operation. For example, the pieces of image data of size w×h may be converted to pieces of image data of size 640×640.

According to the exemplary embodiment, feature points may be detected from the extracted image. For example, the system 100 may detect a plurality of feature points from the dimensionally reduced extracted image. For example, the system 100 may detect cut flower plant quality factors related to petal quality factors, small diseases, and small wounds from at least one feature point.

Meanwhile, the disclosed exemplary embodiments may be implemented in a form of a recording medium for storing commands executable by a computer. The commands may be stored in a form of program code, and may generate program modules when executed by a processor, thereby performing operations of the disclosed exemplary embodiments. The recording medium may be implemented as a computer-readable recording medium.

Computer-readable recording media includes all types of recording media storing commands that may be decoded by a computer. For example, there may be a read only memory (ROM), a random access memory (RAM), a magnetic tape, a magnetic disk, a flash memory, an optical data storage device, etc.

As described above, the disclosed exemplary embodiments have been described with reference to the attached drawings. Those skilled in the art to which the present disclosure pertains will understand that the embodiments of present disclosure may be practiced in forms different from the disclosed embodiments without changing the technical idea or essential features of the present disclosure. The disclosed exemplary embodiments are illustrative and should not be construed as limiting.

What is claimed is:

1. A system for variably predicting vase life of cut flowers, the system comprising:

a first transfer device including a first conveyor belt and a first support member;

a second transfer device including a second conveyor belt and a second support member:

a first photographing device disposed between the first transfer device and the second transfer device and configured to receive cut flowers from the first transfer device, the first photographing device being configured to vertically erect the cut flowers placed horizontally on the first transfer device and transfer the cut flowers to the second transfer device, the first photographing device including a thermal imaging camera to photograph the cut flowers and provide a thermal image;

a second photographing device disposed adjacent to the second transfer device and configured to receive the cut flowers from the second transfer device, the second photographing device including a hyperspectral camera to generate hyperspectral image of the cut flowers, the second photographing device being configure to verify a thermal image on the basis of the hyperspectral image and check temperature of a stem portion of the cut flowers for checking moisture movement;

a prediction device configured to identify a cut flower variety on the basis of the thermal image and the hyperspectral image, set weights of lifespan impact factors affecting the vase life according to the cut flower variety, and set up an artificial intelligence model optimized for the cut flower variety, so as to predict a disease and the vase life of the cut flowers.

2. The system of claim 1, wherein the hyperspectral image comprises RGB information comprising red, green, and blue, infrared information, and ultraviolet information, and the prediction device obtains a first hyperspectral image for a first variety sensed by the hyperspectral camera among a plurality of plant varieties, converts the first hyperspectral image into frequency data in frequency bands, applies a first band-pass filter corresponding to the first variety to the frequency data, and performs post-processing on feature values representing features for each band in the first hyperspectral image.

3. The system of claim 2, wherein the prediction device generates a first feature map by inputting the frequency data to a first artificial intelligence model comprised in a first learning model for processing the thermal image, and outputs a probability value for a temperature of the cut flowers by inputting the first feature map into a second artificial intelligence model comprising a plurality of layers.

4. The system of claim 1, wherein the prediction device adds spectral band factors reflected with the features of the spectral bands to a three-dimensional tensor comprising two-dimensional coordinates and signal intensity, so as to generate a four-dimensional tensor comprising the two-dimensional coordinates, the signal intensity, and the spectral band factors, and performs preprocessing on the hyperspectral image on the basis of the four-dimensional tensor.

5. The system of claim 4, wherein the prediction device learns the four-dimensional tensor generated for the thermal image by using a network function.

6. The system of claim 4, wherein the prediction device learns the three-dimensional tensor generated for the thermal image by using a first network, and relearns the four-dimensional tensor, in which weights corresponding to the spectral band factors are given to the three-dimensional tensor, by using the first network.

7. The system of claim 4, wherein the prediction device performs first learning of the three-dimensional tensor generated for the thermal image by using the first network, performs second learning of a one-dimensional tensor comprising the spectral band factors by using the first network, generates a latent vector (or z) by converting respective results of the first and second learning into a latent space, and restores the thermal image and an image for the frequency data by decoding the latent vector.

8. The system of claim 1, wherein the prediction device generates a bounding box for a specific spot of the cut flowers comprised in the hyperspectral image and the thermal image, extracts features of the cut flowers within the bounding box, determines an abnormal state of the cut flowers on the basis of the cut flower variety and the features of the cut flowers, and outputs a lifespan prediction value for the vase life of the cut flowers on the basis of the abnormal state of the cut flowers and the lifespan impact factors.

9. The system of claim 1, wherein the prediction device obtains training images of the cut flowers, designates cut flower quality factors for quality factors to the cut flowers, learns the training images in order to detect objects for the cut flower variety and each of the quality factors of the cut flowers, extracts object detection item scores to indicate items of detecting the objects as scores on the basis of the results of the learning, and creates a cut flower lifespan prediction model for predicting the vase life of the cut flowers on the basis of the object detection item scores.

10. The system of claim 9, wherein the prediction device obtains new images of the cut flowers, performs preprocessing on data of the new images, detects the cut flower quality factors of the cut flowers on the basis of the preprocessed data, switches the lifespan prediction model with another on the basis of the cut flower quality factors, and predicts the vase life of the cut flowers by using the lifespan prediction model.

11. A method for variably predicting vase life of cut flowers, the method comprising:

receiving, by a first photographing device disposed between a first transfer device and a second transfer device, cut flowers from the first transfer device;

capturing, by a thermal imaging camera included in the first photographing device, a thermal image of the cut flowers;

vertically erecting, by the first photographing device, the cut flowers placed horizontally on the first transfer device and transferring the cut flowers to the second transfer device;

receiving, by a second photographing device disposed adjacent to the second transfer device, cut flowers from the second transfer device;

capturing, by a hyperspectral camera included in the second photographing device, a hyperspectral image, which is a spectrum of the cut flowers; and predicting the vase life of the cut flowers on the basis of the thermal image and the hyperspectral image, wherein the predicting of the vase life of the cut flowers identifies a cut flower variety on the basis of the thermal image and the hyperspectral image, sets weights of lifespan impact factors affecting a lifespan according to the cut flower variety, and sets up an artificial intelligence model optimized for the cut flower variety, so as to predict a disease and the vase life of the cut flowers.

12. The method of claim 11, wherein the hyperspectral image comprises RGB information comprising red, green, and blue, infrared information, and ultraviolet information, and the predicting of the vase life of the cut flowers obtains a first hyperspectral image for a first variety sensed by a hyperspectral camera among a plurality of plant varieties, converts the first hyperspectral image into frequency data in frequency bands, applies a first band-pass filter corresponding to the first variety to the frequency data, and performs post-processing on feature values representing features for each band in the first hyperspectral image.

13. The method of claim 11, wherein the predicting of the vase life of the cut flowers adds spectral band factors reflected with the features of the spectral bands to a three-dimensional tensor comprising two-dimensional coordinates and signal intensity, so as to generate a four-dimensional tensor comprising the two-dimensional coordinates, the signal intensity, and the spectral band factors, and performs preprocessing on the hyperspectral image on the basis of the four-dimensional tensor.

14. The method of claim 11, wherein the predicting of the vase life of the cut flowers generates a bounding box for a specific spot of the cut flowers comprised in the hyperspectral image and the thermal image, extracts features of the cut flowers within the bounding box, determines an abnormal state of the cut flowers on the basis of the cut flower variety and the features of the cut flowers, and outputs a lifespan prediction value for the vase life of the cut flowers on the basis of the abnormal state of the cut flowers and the lifespan impact factors.

15. The method of claim 11, wherein the predicting of the vase life of the cut flowers obtains training images of the cut flowers, designates cut flower quality factors for quality factors to the cut flowers, learns the training images in order to detect objects for the cut flower variety and each of the quality factors of the cut flowers, extracts object detection item scores to indicate items of detecting the objects as scores on the basis of results of learning, and creates a cut flower lifespan prediction model for predicting the vase life of the cut flowers on the basis of the object detection item scores.

16. A device for variably predicting vase life of cut flowers, the device comprising:

a first transfer device including a first conveyor belt and a first support member;

a second transfer device including a second conveyor belt and a second support member;

a first photographing device disposed between the first transfer device and the second transfer device and configured to receive cut flowers from the first transfer device, the first photographing device being configured to vertically erect the cut flowers placed horizontally on the first transfer device and transfer the cut flowers to the second transfer device, the first photographing device including a thermal imaging camera to photograph the cut flowers and provide a thermal image;

a second photographing device disposed adjacent to the second transfer device and configured to receive the cut flowers from the second transfer device, the second photographing device including a hyperspectral camera to generate hyperspectral image of the cut flowers, the second photographing device being configure to verify a thermal image on the basis of the hyperspectral image and check temperature of a stem portion of the cut flowers for checking moisture movement;

a storage unit configured to store information on an algorithm for performing operations and an artificial intelligence model; and a processor configured to identify a cut flower variety on the basis of the thermal image and the hyperspectral image, which are for the cut flowers and received from the outside, set weights of lifespan impact factors affecting a lifespan according to the cut flower variety, and set up the artificial intelligence model optimized for the cut flower variety, so as to predict a disease and the vase life of the cut flowers.

17. The device of claim 16, wherein the hyperspectral image comprises RGB information comprising red, green, and blue, infrared information, and ultraviolet information from a hyperspectral camera, obtains a first hyperspectral image for a first variety sensed by the hyperspectral camera among a plurality of plant varieties, converts the first hyperspectral image into frequency data in frequency bands, applies a first band-pass filter corresponding to the first variety to the frequency data, and performs post-processing on feature values representing features for each band in the first hyperspectral image.

18. The device of claim 16, wherein the processor adds spectral band factors reflected with the features of the spectral bands to a three-dimensional tensor comprising two-dimensional coordinates and signal intensity, so as to generate a four-dimensional tensor comprising the two-dimensional coordinates, the signal intensity, and the spectral band factors, and performs preprocessing on the hyperspectral image on the basis of the four-dimensional tensor.

19. The device of claim 16, wherein the processor generates a bounding box for a specific spot of the cut flowers comprised in the hyperspectral image and the thermal image, extracts features of the cut flowers within the bounding box, determines an abnormal state of the cut flowers on the basis of the cut flower variety and the features of the cut flowers, and outputs a lifespan prediction value for the vase life of the cut flowers on the basis of the abnormal state of the cut flowers and the lifespan impact factors.

20. The device of claim 16, wherein the processor obtains training images of the cut flowers, designates cut flower quality factors for quality factors to the cut flowers, learns the training images in order to detect objects for the cut flower variety and each of the quality factors of the cut flowers, extracts object detection item scores to indicate items of detecting the objects as scores on the basis of results of learning, and creates a cut flower lifespan prediction model for predicting the vase life of the cut flowers on the basis of the object detection item scores.

* * * * *